(12) United States Patent
Nealand et al.

(10) Patent No.: US 12,243,235 B2
(45) Date of Patent: Mar. 4, 2025

(54) SYSTEMS AND METHODS FOR EXTRACTING HEADSHOTS FROM IMAGES

(71) Applicant: PROMPTU SYSTEMS CORPORATION, Menlo Park, CA (US)

(72) Inventors: James Henry Nealand, Queensland (AU); Blair William Thomas Fidler, Queensland (AU)

(73) Assignee: PROMPTU SYSTEMS CORPORATION, Menlo Park, CA (US)

(*) Notice: Subject to any disclaimer, the term of this patent is extended or adjusted under 35 U.S.C. 154(b) by 340 days.

(21) Appl. No.: 17/648,292

(22) Filed: Jan. 18, 2022

(65) Prior Publication Data

US 2022/0277458 A1 Sep. 1, 2022

Related U.S. Application Data

(60) Provisional application No. 63/138,445, filed on Jan. 16, 2021, provisional application No. 63/138,390, filed on Jan. 15, 2021.

(51) Int. Cl.
*G06T 7/11* (2017.01)
*G06V 40/16* (2022.01)

(52) U.S. Cl.
CPC .............. *G06T 7/11* (2017.01); *G06V 40/166* (2022.01); *G06V 40/172* (2022.01); *G06T 2207/20132* (2013.01); *G06T 2207/30201* (2013.01)

(58) Field of Classification Search
CPC .............. G06T 7/11; G06T 2207/20132; G06T 2207/30201; G06V 40/172; G06V 40/166
See application file for complete search history.

(56) References Cited

U.S. PATENT DOCUMENTS

| 2009/0220127 A1* | 9/2009 | Bedros ................. G06V 40/172 382/118 |
| 2013/0108166 A1 | 5/2013 | Ptucha |
| 2013/0108171 A1 | 5/2013 | Ptucha |
| 2013/0121571 A1 | 5/2013 | Gokturk et al. |
| 2018/0063482 A1 | 3/2018 | Goesnar |
| 2019/0080155 A1* | 3/2019 | Ganong ............... G06V 40/167 |

(Continued)

OTHER PUBLICATIONS

European Patent Office, Extended European Search Report, pp. 1-12, Nov. 11, 2024.

*Primary Examiner* — Syed Haider
(74) *Attorney, Agent, or Firm* — Perkins Coie LLP; Michael Glenn; Andrew T. Pettit

(57) ABSTRACT

Various embodiments contemplate systems, architectures and methods for extracting and selecting headshots of human or non-human entities from catalogs of images of such subjects. The methods described may find and extract faces from within groups of subjects, verify that the extracted faces correspond to the desired subject, determine cropping or masking regions, or both, of rectangular, circular, elliptical or some other geometry to provide an easily recognized image of the desired subject, expand the output image by synthesizing pixels as may be needed for a desired cropping or masking region, select preferred images among a collection of images of the desired subject, and perform other useful functions. The resulting output images may be in either direct form, reference form or both forms.

17 Claims, 28 Drawing Sheets

(56) References Cited

U.S. PATENT DOCUMENTS

2019/0266450 A1    8/2019  Van Rensburg et al.
2021/0097263 A1*  4/2021  Scott .................... G06V 40/173
2021/0390789 A1*  12/2021  Liu ...................... G06V 40/161

* cited by examiner

Figure 6:
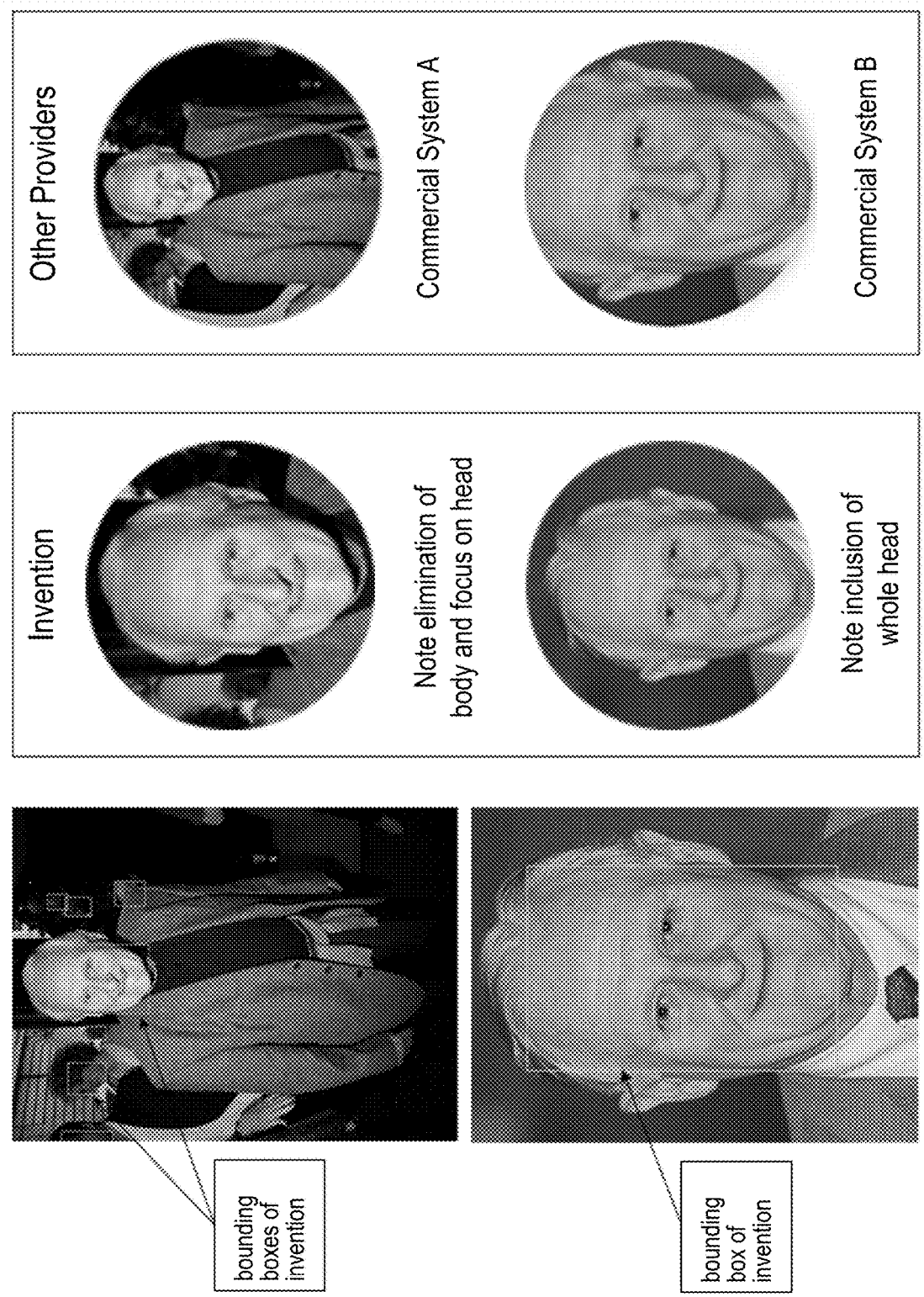

Figure 6: Peter Vaughn

Figure 7:
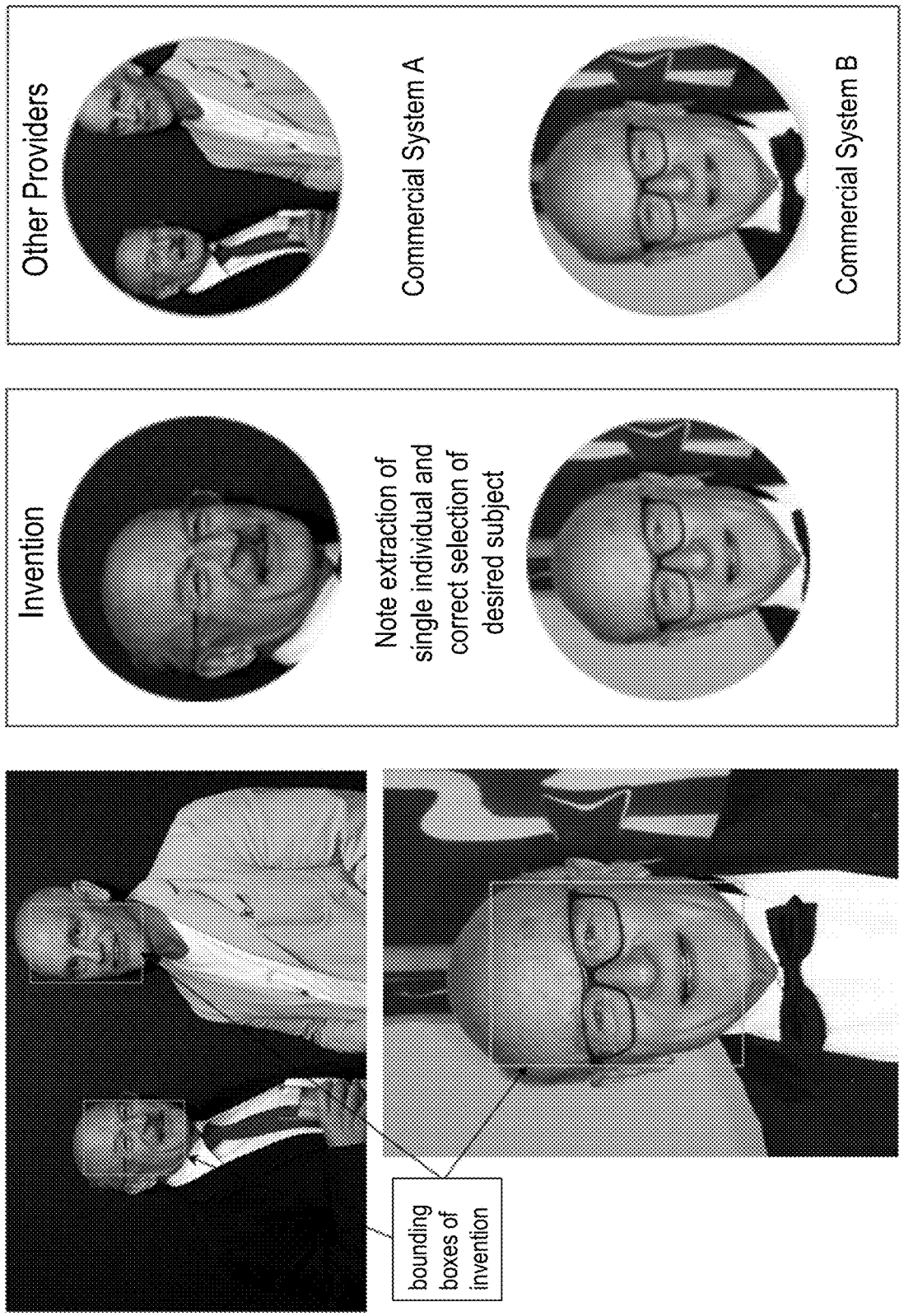

Figure 7: Volker Schlondorff

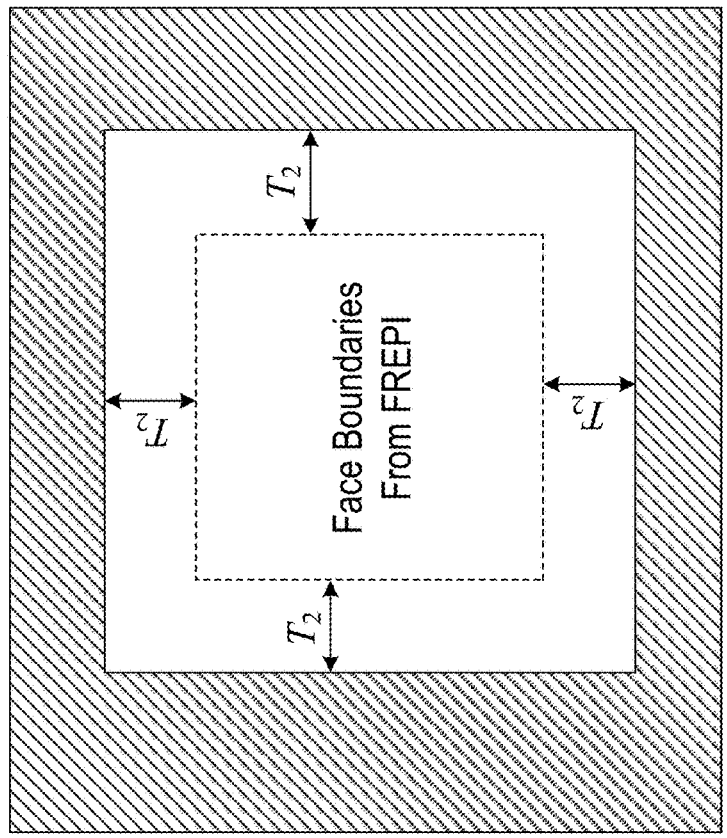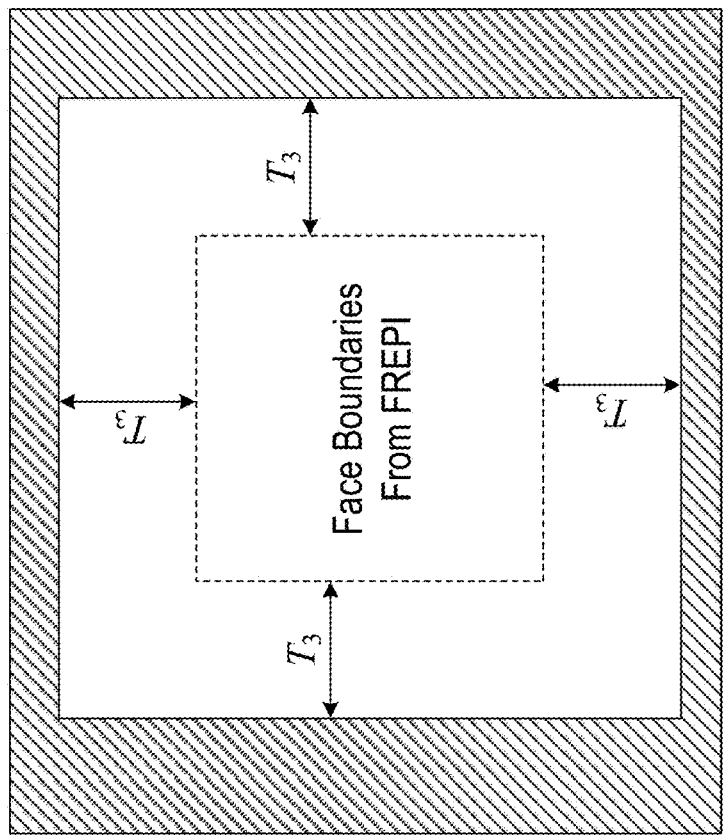
Figure 11

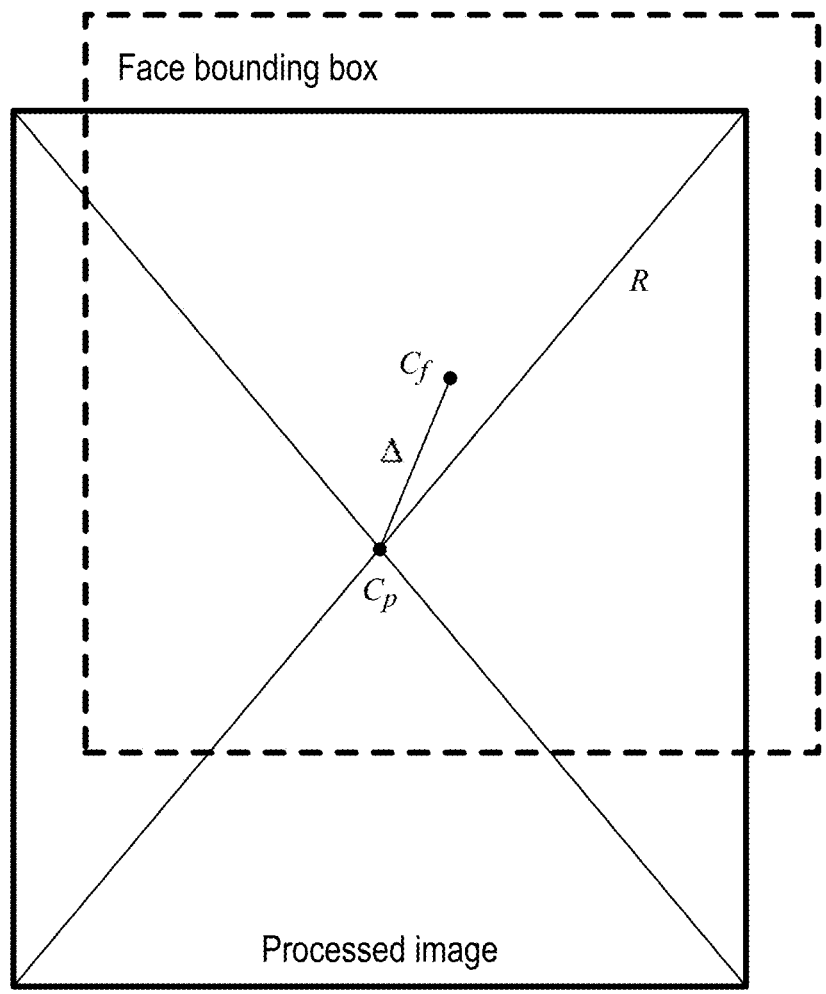

$C_f$ is the center of the face bounding box
$C_p$ is the center of the processed image
$\Delta$ distance between $C_f$ and $C_p$
$\Delta = |C_f - C_p|$
$R$ distance from $C_p$ to the corner of the processed image
It can be seen that $0 \leq \Delta \leq R$
When $\Delta = 0$, we want the desirability to be 1.0, and when $\Delta = R$, we want the desirability to be 0
This is done with the straight line equation $$D_{Centeredness}(\Delta) = \frac{R-\Delta}{R} = 1 - \frac{\Delta}{R}$$

Figure 17

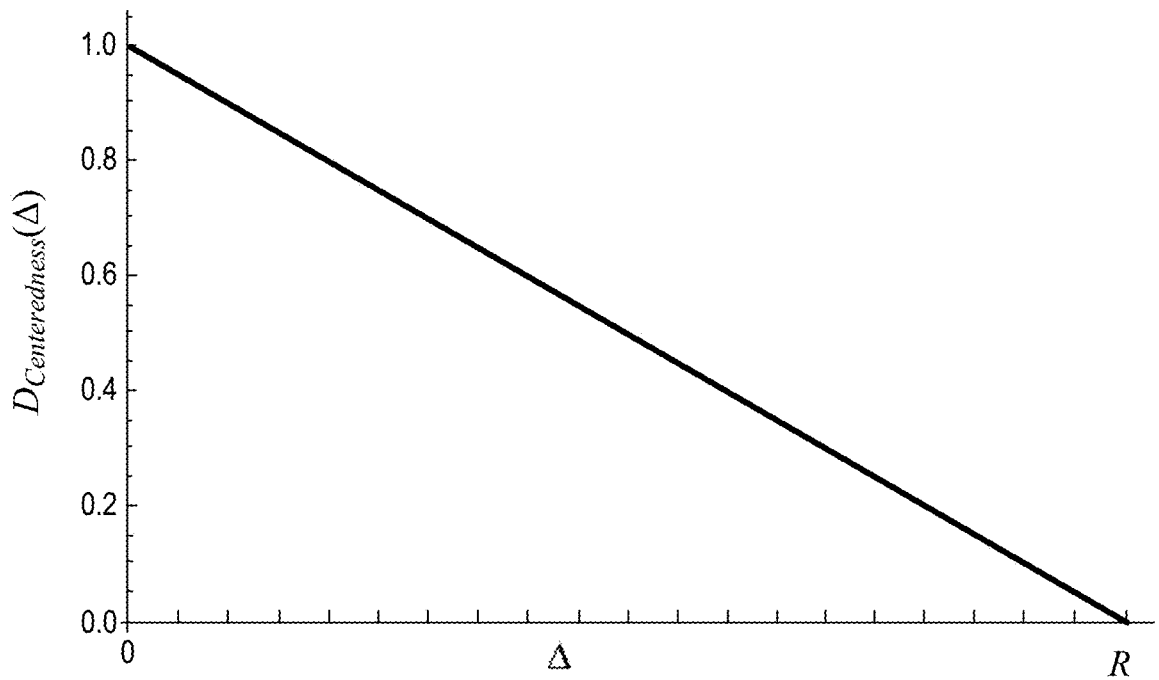
Figure 18: Desirability Function for Centeredness

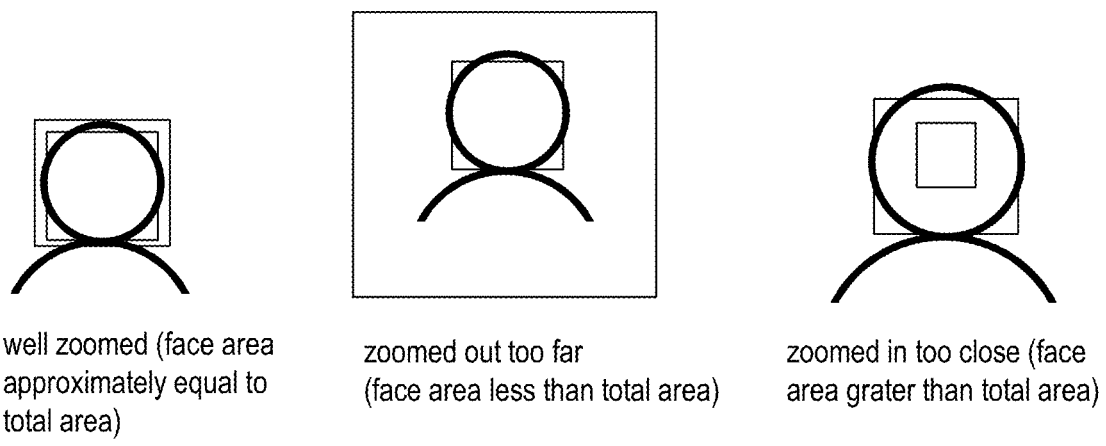
Figure 19: Illustration of Zoom Levels

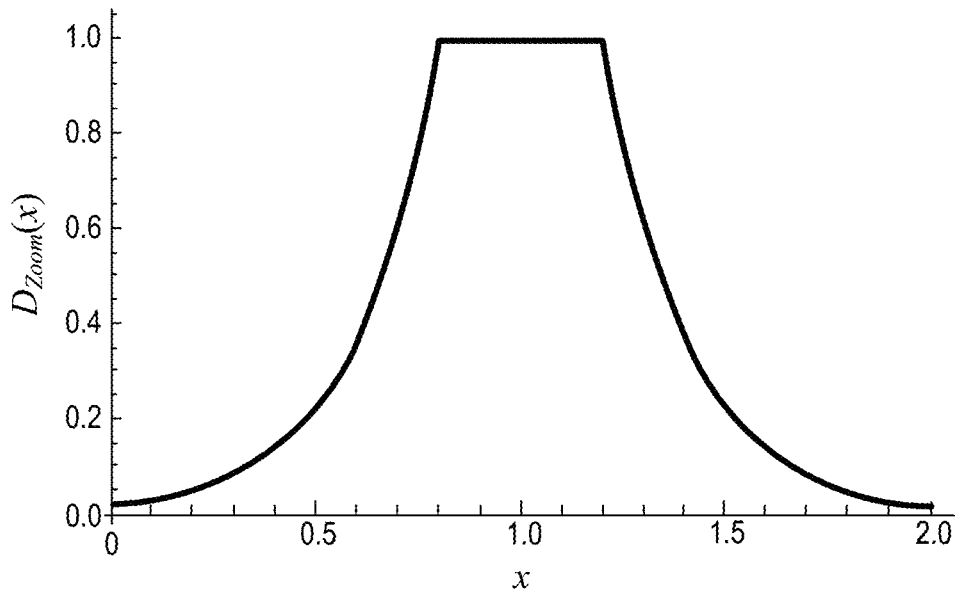

Horizontal axis is informant "*zoom,*" the ratio of the area of the face bounding box in the processed image to the total area of the processed image. That is, $$x = "zoom" = \frac{area_{face}}{area_{total}}.$$

Vertical axis is the value of the desirability function $D_{Zoom}("zoom") = D_{Zoom}(x)$ where $$D_{Zoom}(x) = \begin{cases} e^{5(x-0.8)} & x < 0.8 \\ 1 & 0.8 \leq x \leq 1.2 \\ e^{5(1.2-x)} & x > 1.2 \end{cases}$$

This example shows the graph for $z_{min} = 0.8$ and $z_{max} = 1.2$.

Figure 20: Desirability Function for Zoom

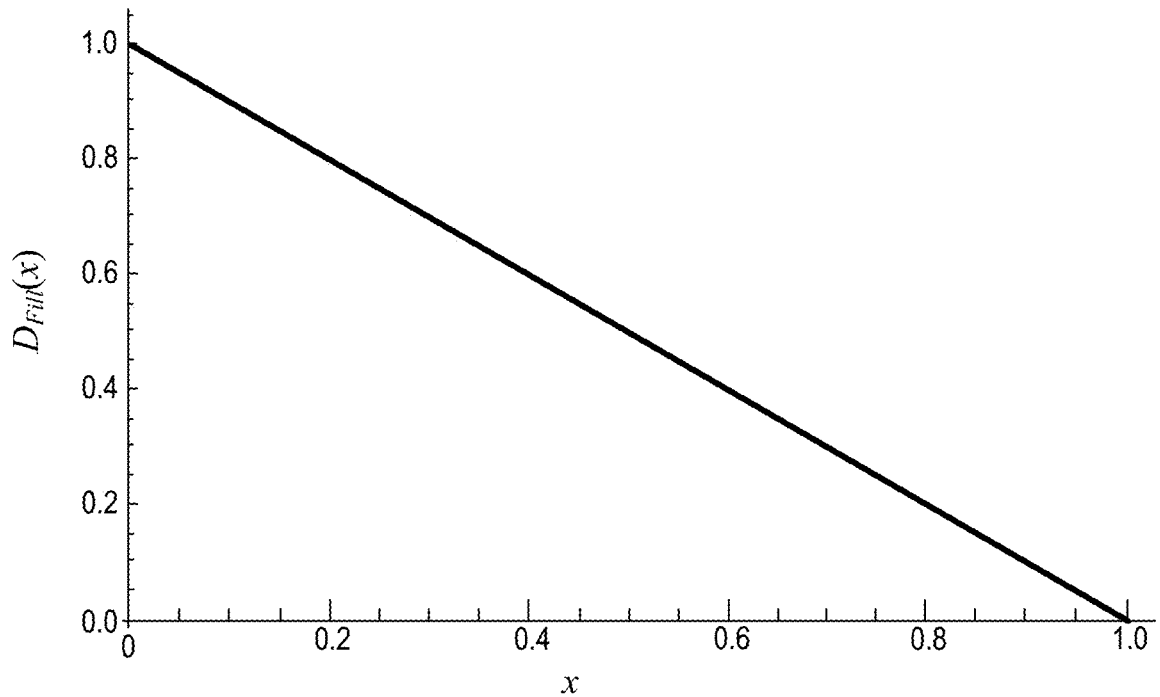
Horizontal axis is the ratio of the filled area to the area of the processed image. That is,
$$x = \frac{area_{filled}}{area_{total}}.$$
Vertical axis is the value of the desirability function $D_{Fill}(x)$ where
$$D_{Fill}(x) = 1-x$$
Figure 21: Desirability Function for Fill

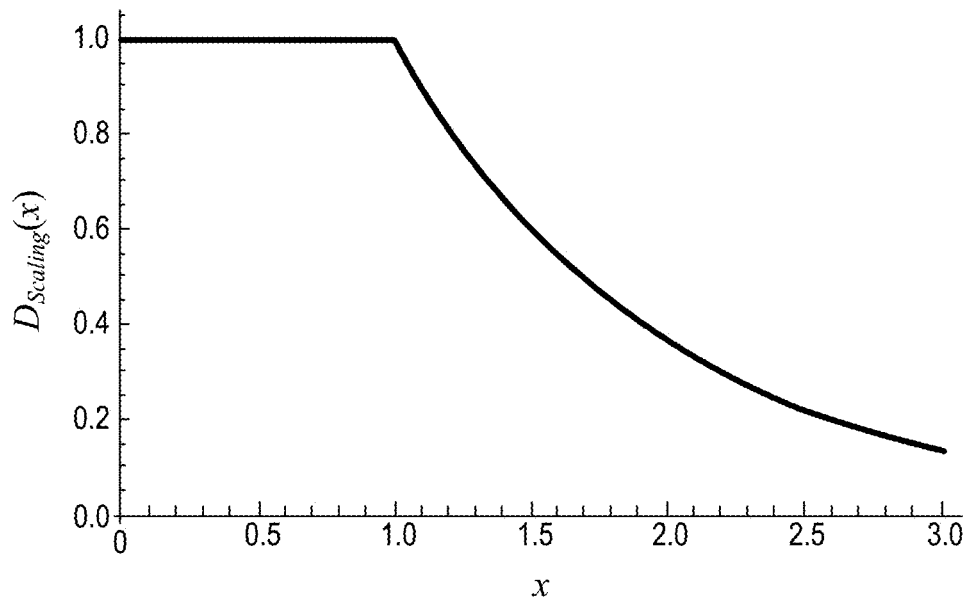

Horizontal axis is informant "*scale*," the ratio of the area of the face bounding box in the processed image to the total area of the processed image. That is, $$x = \text{"}scale\text{"} = \frac{area_{face}}{area_{total}}.$$

Vertical axis is the value of the desirability function $D_{Scaling}(\text{"}scale\text{"}) = D_{Scaling}(x)$ where $$D_{Scaling}(x) = \begin{cases} 1 & x < 1 \\ e^{1-x} & x \geq 1 \end{cases}$$

Figure 22: Desirability Function for Scaling

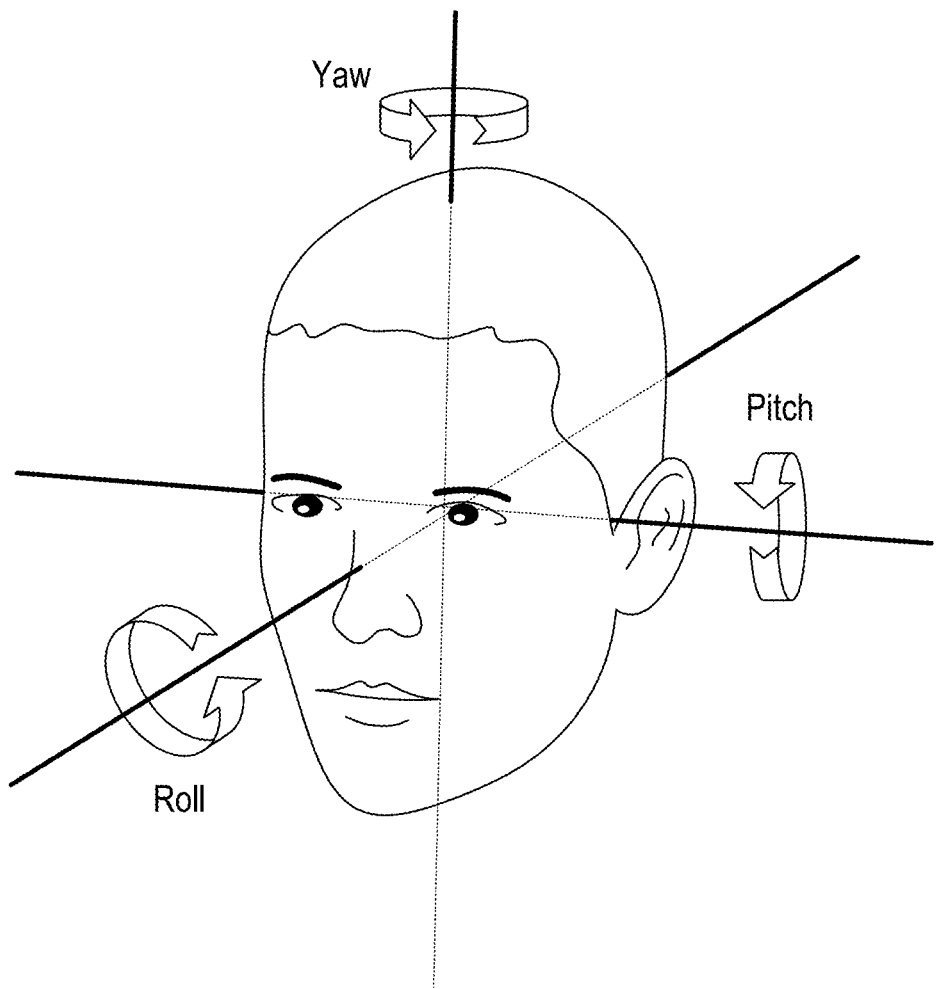
Figure 23: Explanation of Yaw for a Face Image

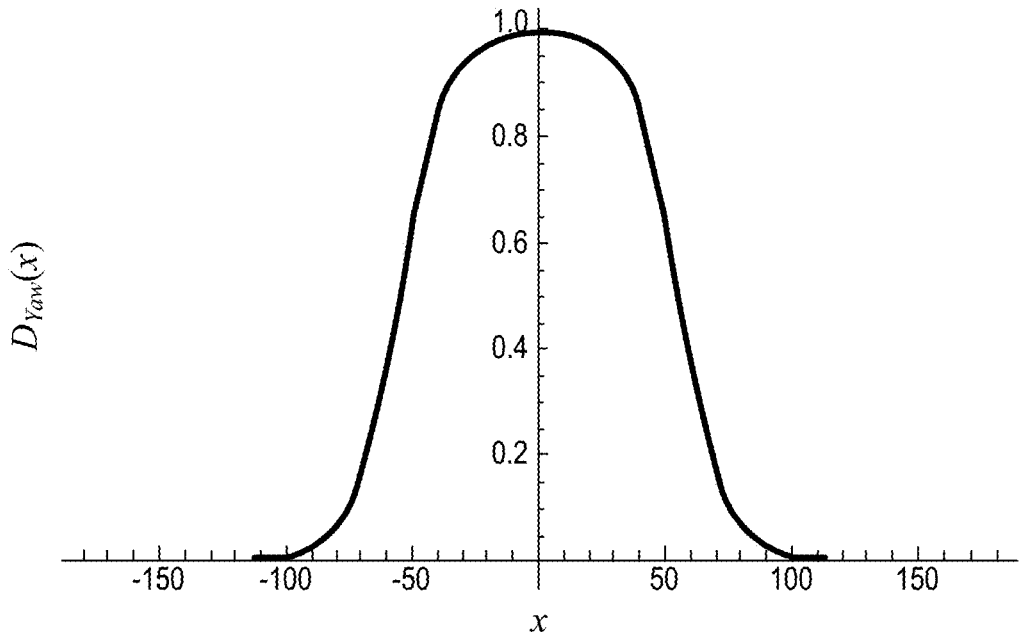
Horizontal axis is informant "*yaw*" measured in degrees. That is,
$$x = \text{"}yaw\text{"}.$$
Vertical axis is the value of the desirability function $D_{Yaw}(\text{"}yaw\text{"}) = D_{Yaw}(x)$ where
$$D_{Yaw}(x) = \begin{cases} \dfrac{1}{1+e^{-\left(\frac{12}{100}x+6\right)}} & x < 0 \\ \dfrac{1}{1+e^{\left(\frac{12}{100}x-6\right)}} & x \geq 0 \end{cases}$$
Figure 24: Desirability Function for Yaw

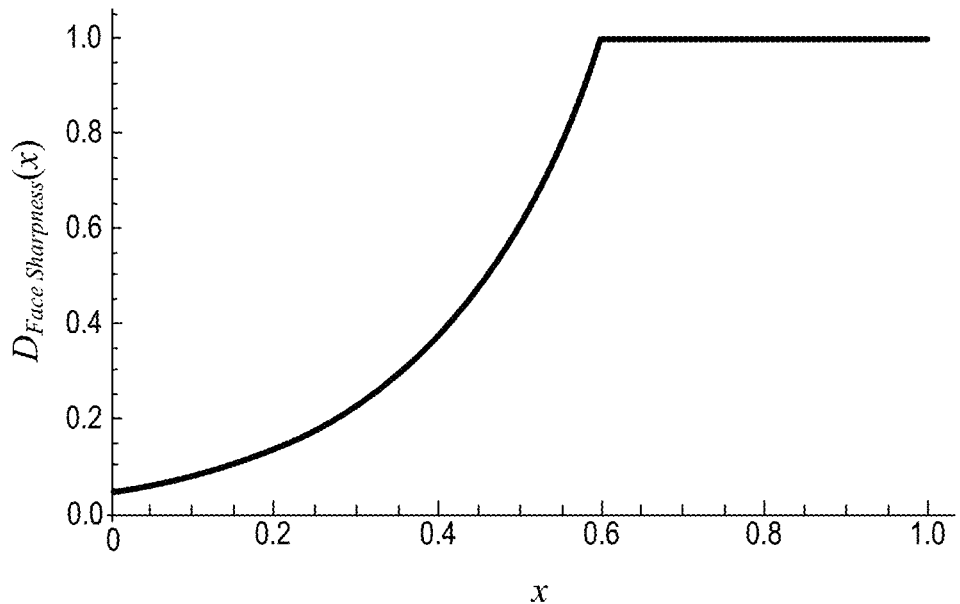

Horizontal axis is informant "*sharpness.*" Assumes that "*sharpness*" is measured on a scale of 0 to 1. That is, $$x = \text{"sharpness"}.$$

Vertical axis is the value of the desirability function $D_{Face\ Sharpness}(\text{"sharpness"}) = D_{Face\ Sharpness}(x)$ where $$D_{Face\ Sharpness}(x) = \begin{cases} e^{5(x-0.6)} & x < 0.6 \\ 1 & 0.6 \leq x \end{cases}$$

This example shows the graph for $s_{min} = 0.6$.

Figure 25: Desirability Function for Face Sharpness

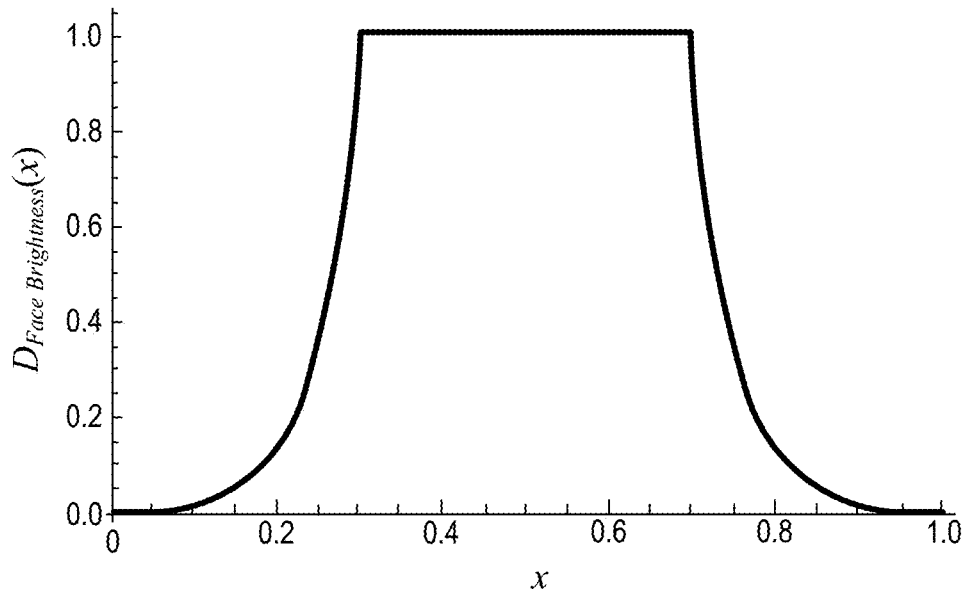

Horizontal axis is informant "*brightness.*" Assumes that "*brightness*" is measured on a scale of 0 to 1. That is, $$x = \text{"brightness"}.$$

Vertical axis is the value of the desirability function $D_{Face\ Brightness}(\text{"brightness"}) = D_{Face\ Brightness}(x)$ where $$D_{Face\ Brightness}(x) = \begin{cases} e^{20(x-0.3)} & x < 0.3 \\ 1 & 0.3 \leq x \leq 0.7 \\ e^{20(0.7-x)} & x < 0.7 \end{cases}$$

This example shows the graph for $b_{min} = 0.3$ and $b_{max} = 0.7$.

Figure 26: Desirability Function for Face Brightness

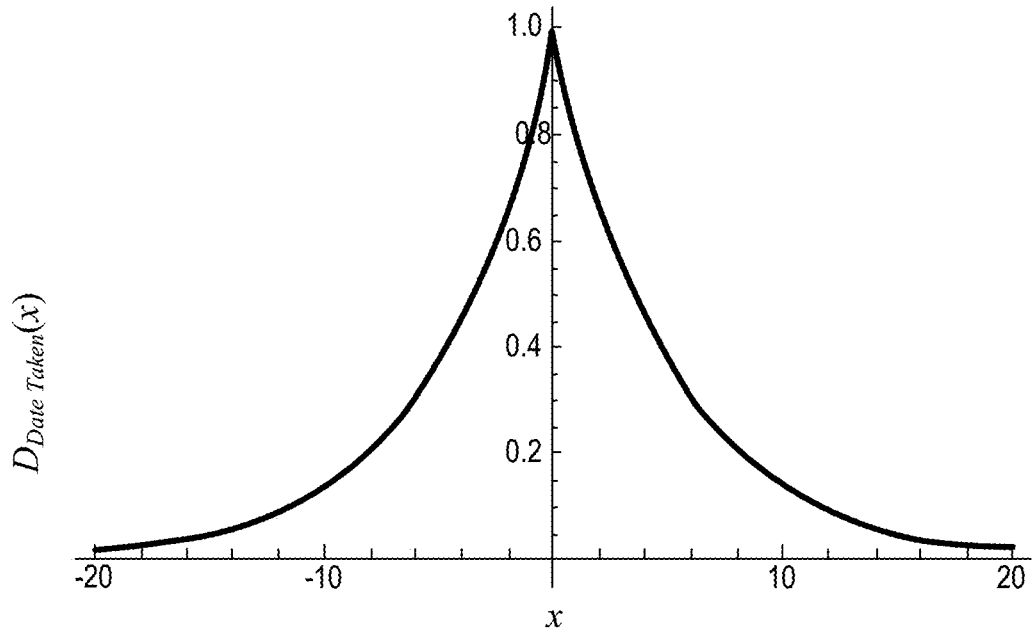
Horizontal axis is the difference between informants *"datestamp"* and *"referencedate."* That is,
$$x = \text{"datestamp"} - \text{"referencedate."}$$
Vertical axis is the value of the desirability function
$D_{Date\ Taken}(\text{"datestamp"} - \text{"referencedate"}) = D_{Date\ Taken}(x)$ where
$$D_{DateTaken}(x) = e^{-\frac{4}{20}|x|}$$
Figure 27: Desirability Function for Date Taken

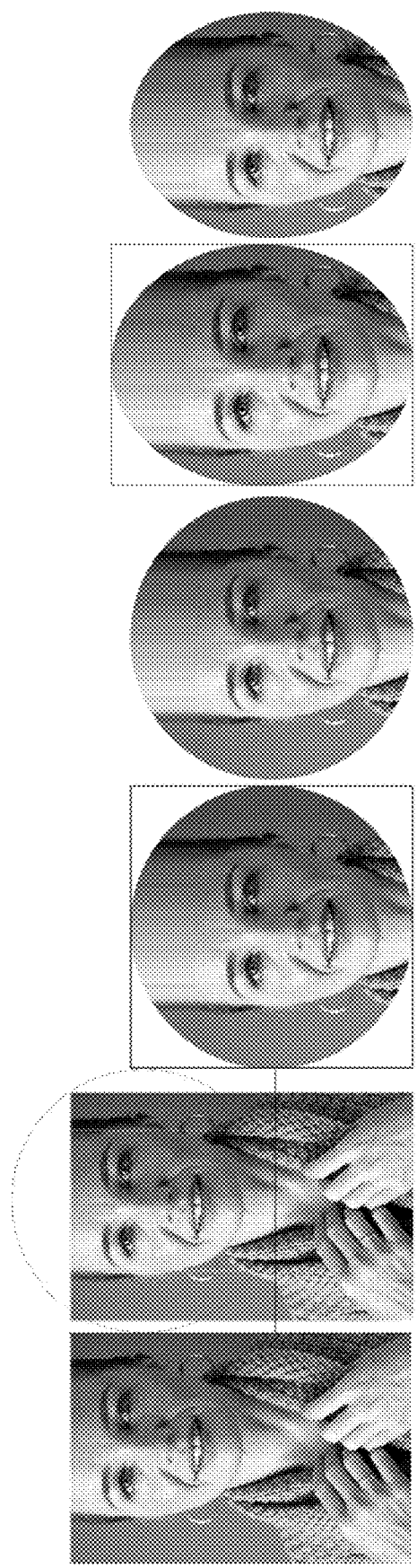
Original image and images showing undesired artifacts with nominal methods for circular and elliptical cropping, masking and expansion. Images shown with annotation, and with and without outer bounding box.
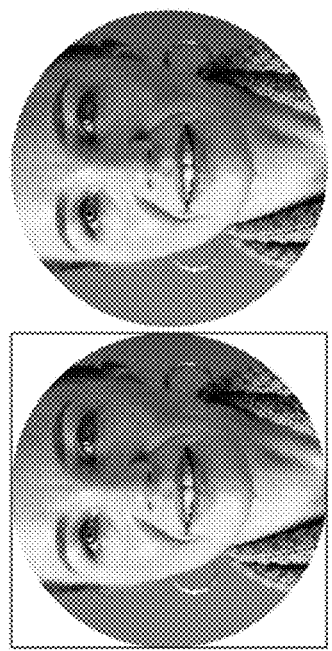
Images showing effect of alternate algorithms for masking and expansion.
Figure 28

SYSTEMS AND METHODS FOR EXTRACTING HEADSHOTS FROM IMAGES

CROSS-REFERENCE TO RELATED APPLICATIONS

This filing claims priority to U.S. Provisional Application No. 63/138,390, filed on Jan. 15, 2021, and U.S. Provisional Application No. 63/138,445, filed on Jan. 16, 2021, each of which is incorporated by reference herein in its entirety.

TECHNICAL FIELD

The technical field of the invention relates to automatic processing of digitized images, particularly systems, methods and architectures for identifying the content of images and locating faces within images.

BACKGROUND OF THE INVENTION

Many means of presenting information to consumers involve showing images of faces, for example but not exclusively the faces of celebrities. The medium for presentation may be the screen of a handheld or other small electronic device; it may also be a print medium or any other medium of presentation. The space for presentation is often small, due to any of: the small size of the device, the large number of images to be displayed, or other considerations.

In addition many computational systems or devices, for instance systems that automatically identify an individual within an image, require or will provide superior performance if the region of the image that comprises the subject's face is selected or extracted, excluding other portions or regions of the image, with said selected or extracted portion or region provided as input to the system. Such selection or extraction may be useful both in the construction or adaptation of the subject system or device, sometimes referred to as "training," or in the operation of a suitably constructed or adapted system or device.

In these cases, and in others as well, it is naturally desirable to select, extract, and possibly in addition process, modify or prepare, an easily recognizable image of the person, persons or entity in question. The word "entity" is used advisedly here; the invention contemplates explicitly treating images of non-humans, for example but not exclusively both real but non-human animals, and also non-real entities like cartoon characters or other works of art. Moreover, throughout this document the words "celebrity" and "celebrities," while motivating the use and value of the invention, are to be understood solely as referencing a given subject entity, and not attributing thereto any particular level of fame, public recognition or accomplishment.

Figure 1:
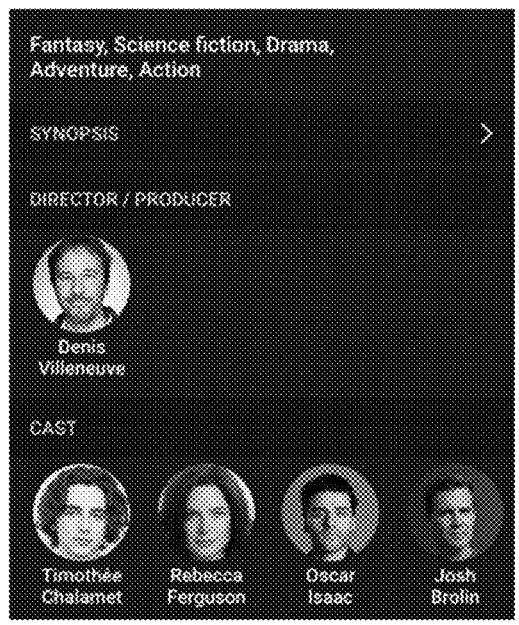

Such images are often drawn from commercial catalogs that purportedly contain images of specific celebrities. While some of these images are headshots, many are full-body shots, and some may depict multiple people. On small handheld devices, such as phones and tablets, the size of the displayed image is small, so displaying a full-body or group image may render the celebrity unrecognizable. FIG. 1, which is a screenshot of a smartphone application, shows a typical use of celebrity images.

SUMMARY OF THE INVENTION

For the reasons given above, when preparing images of celebrity faces, it is therefore desirable to process one or more images of a celebrity, typically drawn from one or more image catalogs, to determine an appropriate region of an image containing the subject celebrity's face, to crop and possibly in addition crop or mask that portion of the image to yield a facial image, and to possibly select among or order by preference possibly more than one facial image for display in any of electronic, print or some other form or medium, for utilization or input to another device or system, or for any other suitable purpose. However as the number of images in any such catalog may number in the hundreds of thousands or more, it is not practical to perform these steps by hand. A fully- or semi-automatic solution is desired.

Other important advantages may accrue from cropping a desired portion of a larger image. Notably if a device for displaying an image is a mobile device, by performing said cropping, it may be possible to reduce the amount of data that is transmitted to said mobile device. This may reduce the time to transmit the image, the economic cost of transmitting the image, or both. Another advantage may be the reduced space required to store the cropped image.

The invention exists in a variety of forms, according a variety of benefits to both operators of the system and consumers and users of its output. The invention comprises all of an entire system and variants thereof, the architecture of the entire system and variants thereof, and methods for performing certain operations that may comprise elements of the system and variants thereof. The invention may include components, steps or modules that perform any or all of: selecting among images for further processing, extracting one or more regions of an image that nominally include a face, cropping and/or masking regions of an image, synthesizing regions or portions of an image, any or all of the aforesaid yielding a processed image, selecting among processed images, preparing images for presentation by electronic or digital devices, by print media or any other means, and storing images. The invention may perform additional operations as well. The word "images" is intended to include at least still images and moving images.

BRIEF DESCRIPTIONS OF THE DRAWINGS

One or more embodiments of the present disclosure are illustrated by way of example and not limitation in the figures of the accompanying drawings, in which like references indicate similar elements.

FIG. 1: Application Screenshot. This is a screenshot of a smartphone application showing a typical use of images of celebrity faces, after the operation of the invention. Note the use of circular masking of the images.

Figure 2:
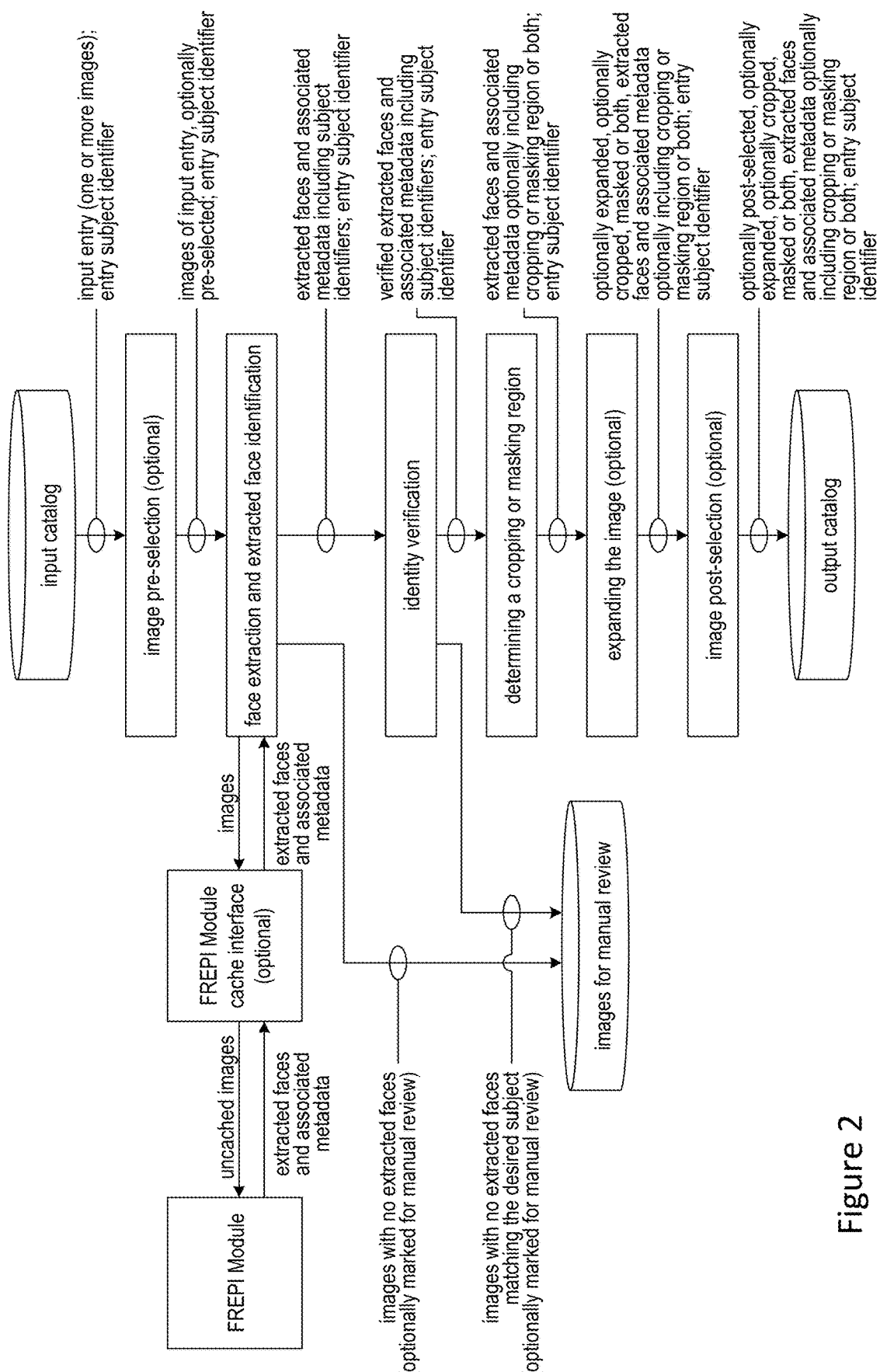

FIG. 2: Flow Diagram for One Implementation of the Invention. This diagram that shows elements, decision points and data flows within one exemplary implementation of the invention.

Figure 3:
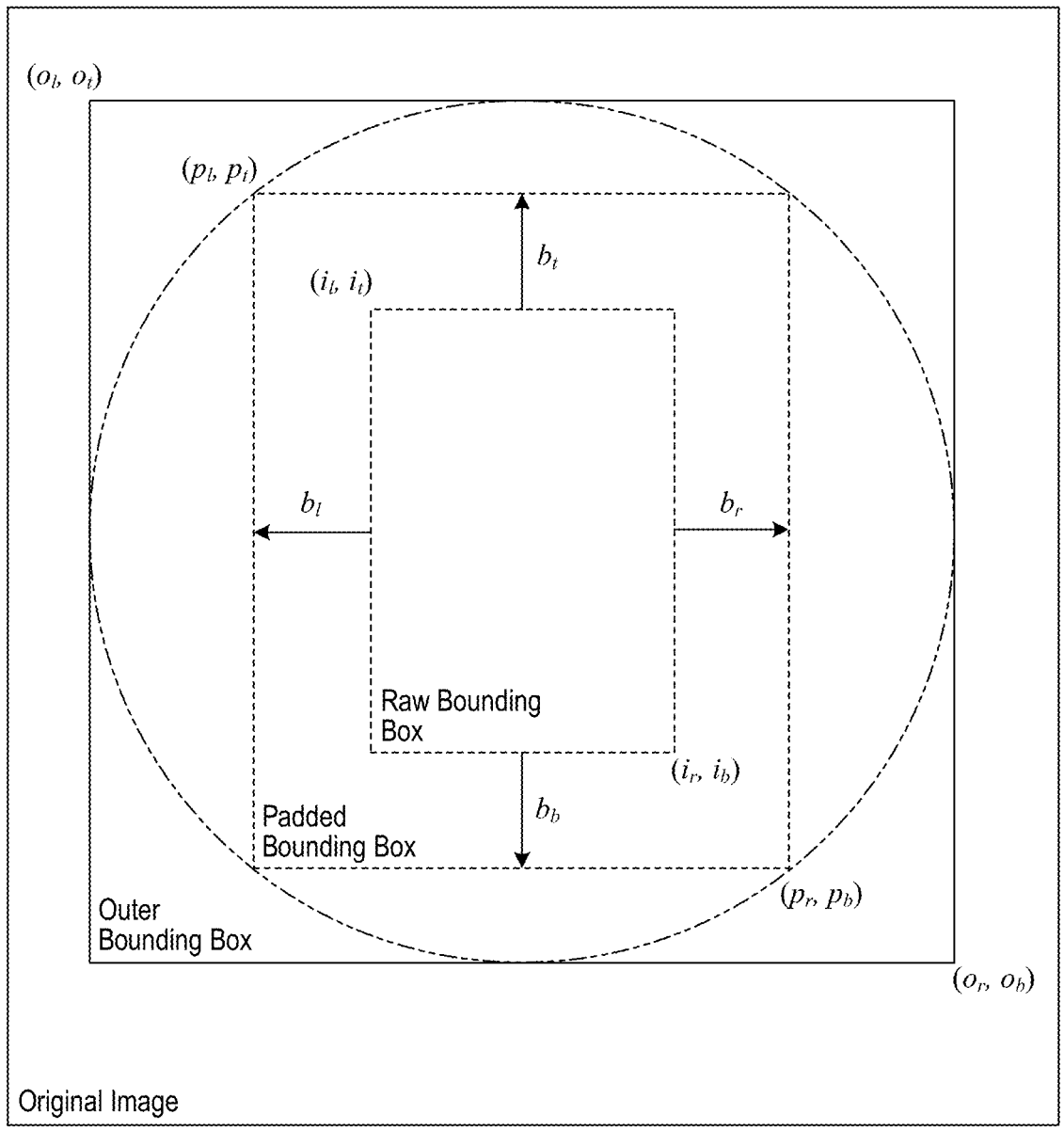

FIG. 3: Extraction of a Circular Region of Interest. This diagram shows various geometric elements, and the meaning of associated variables and coordinates, related to the extraction of a circular region of interest that contains a subject face.

Figure 4:
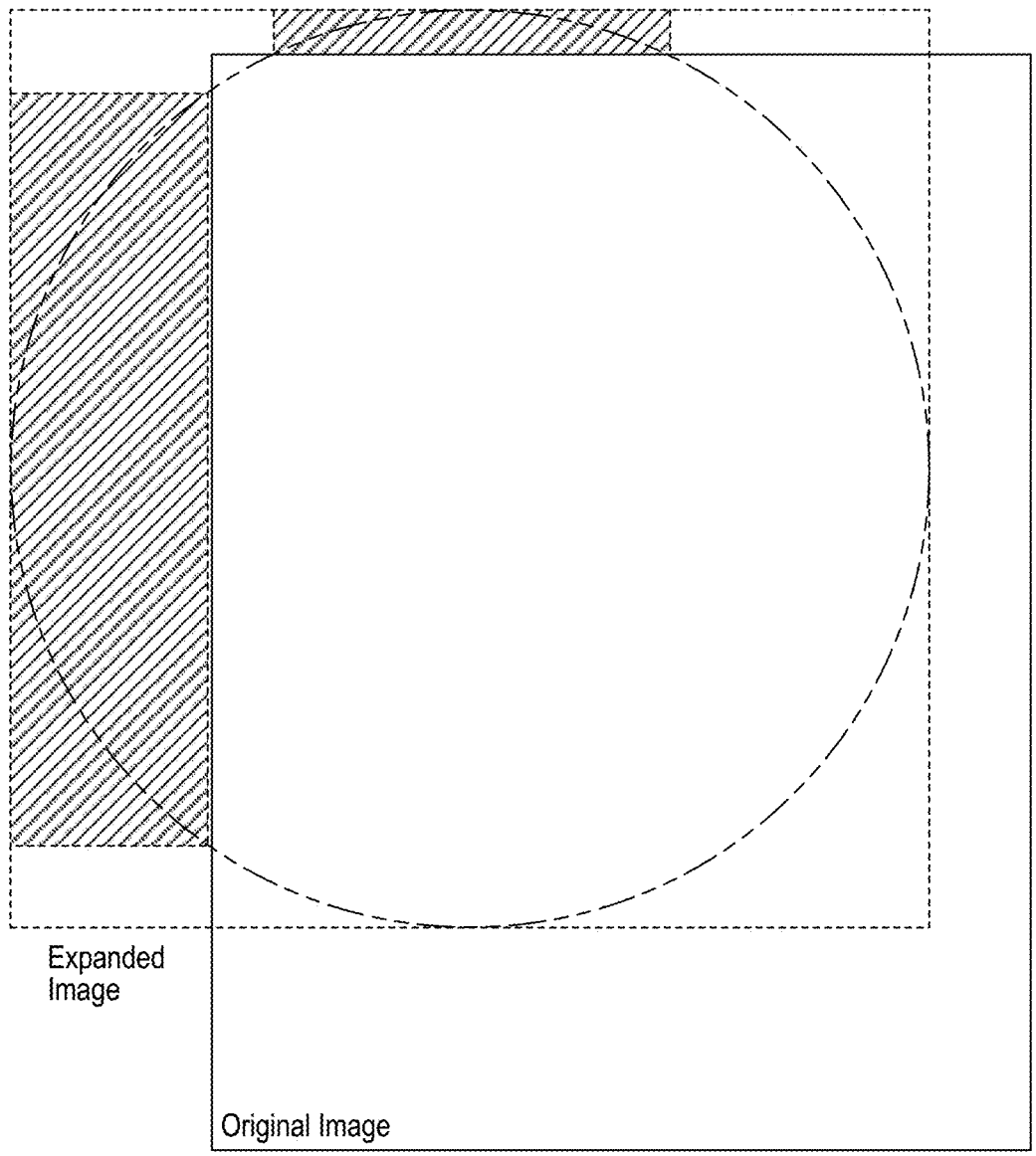

FIG. 4: Expanding Image with Additional Pixels. This diagram shows various geometric elements associated with expanding a subject image by synthesizing pixels to fill out a circular region of interest.

Figure 5:
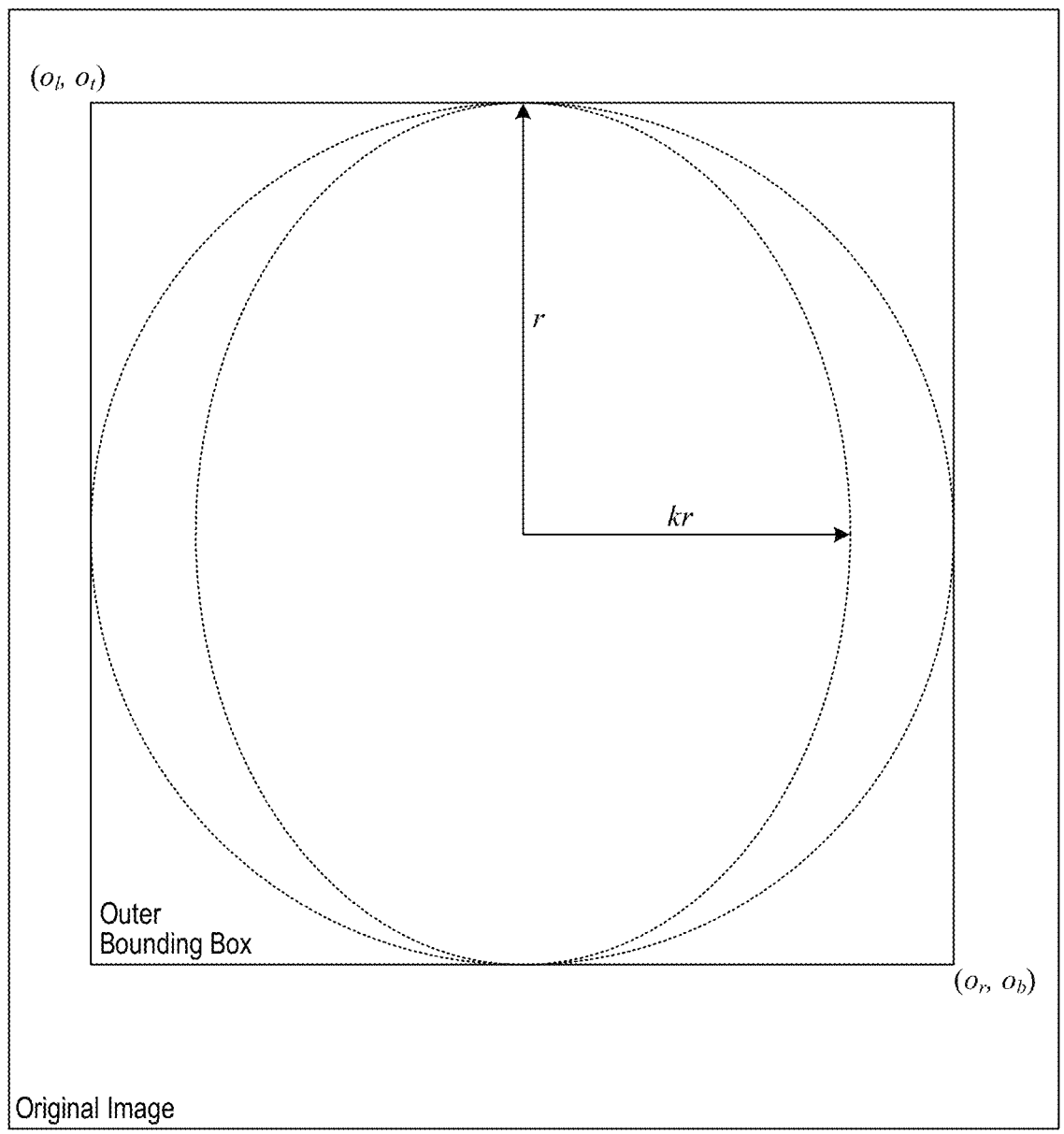

FIG. 5: Extraction of an Elliptical Region of Interest. This diagram shows various geometric elements, and the meaning of associated variables and coordinates, related to the extraction of an elliptical region of interest that contains a subject face.

FIG. 6: Comparison of Operation of the Invention, Example A. This figure depicts the results provided by the invention with the results provided by two competing commercial systems, for one exemplary celebrity.

FIG. 7: Comparison of Operation of the Invention, Example B. This figure depicts the results provided by the invention with the results provided by two competing commercial systems, for another exemplary celebrity.

Figure 8:
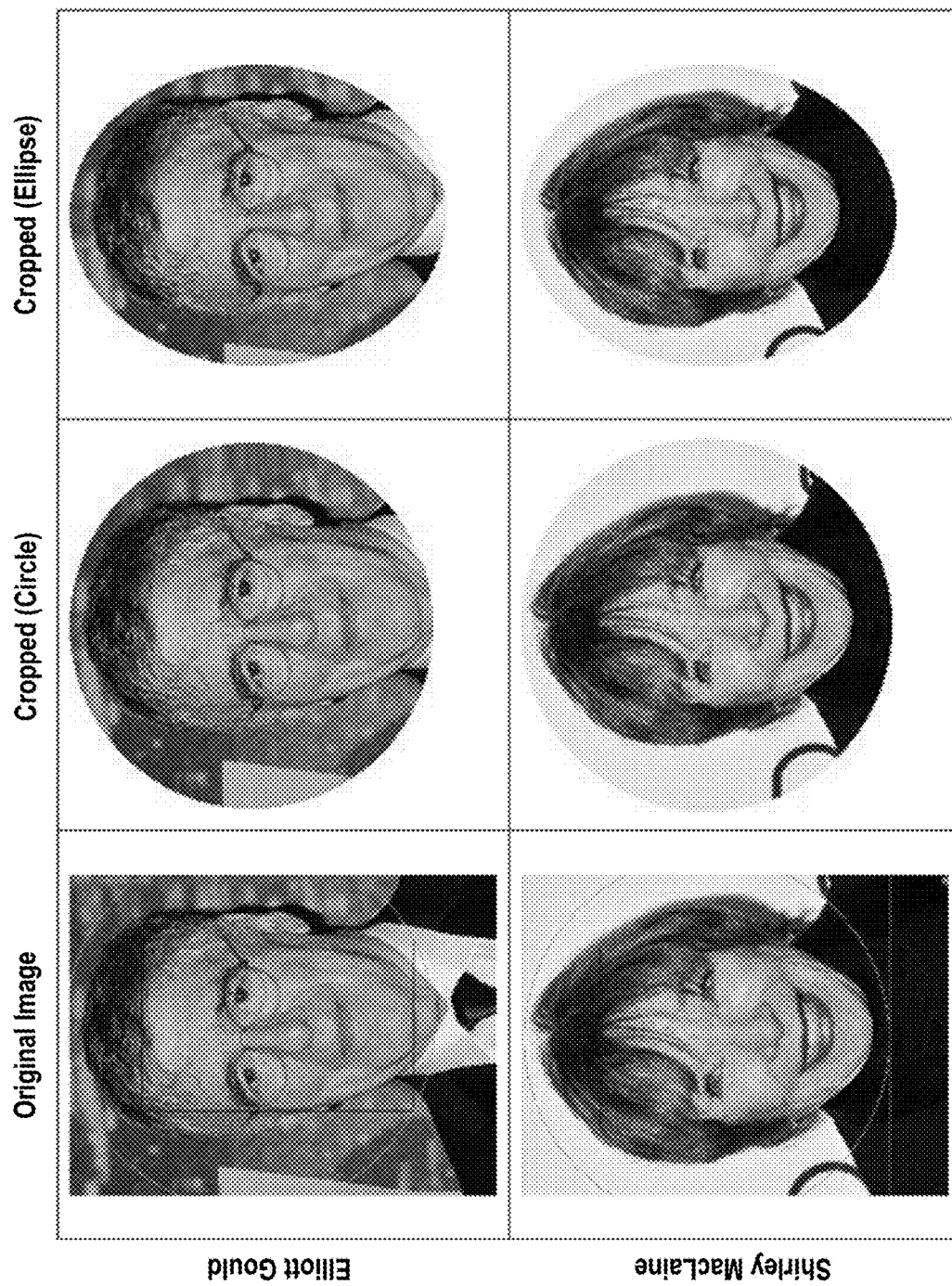

FIG. 8: Examples of Operation of the Invention, Illustrating Circular and Elliptical Regions of Interest.

Figure 9:
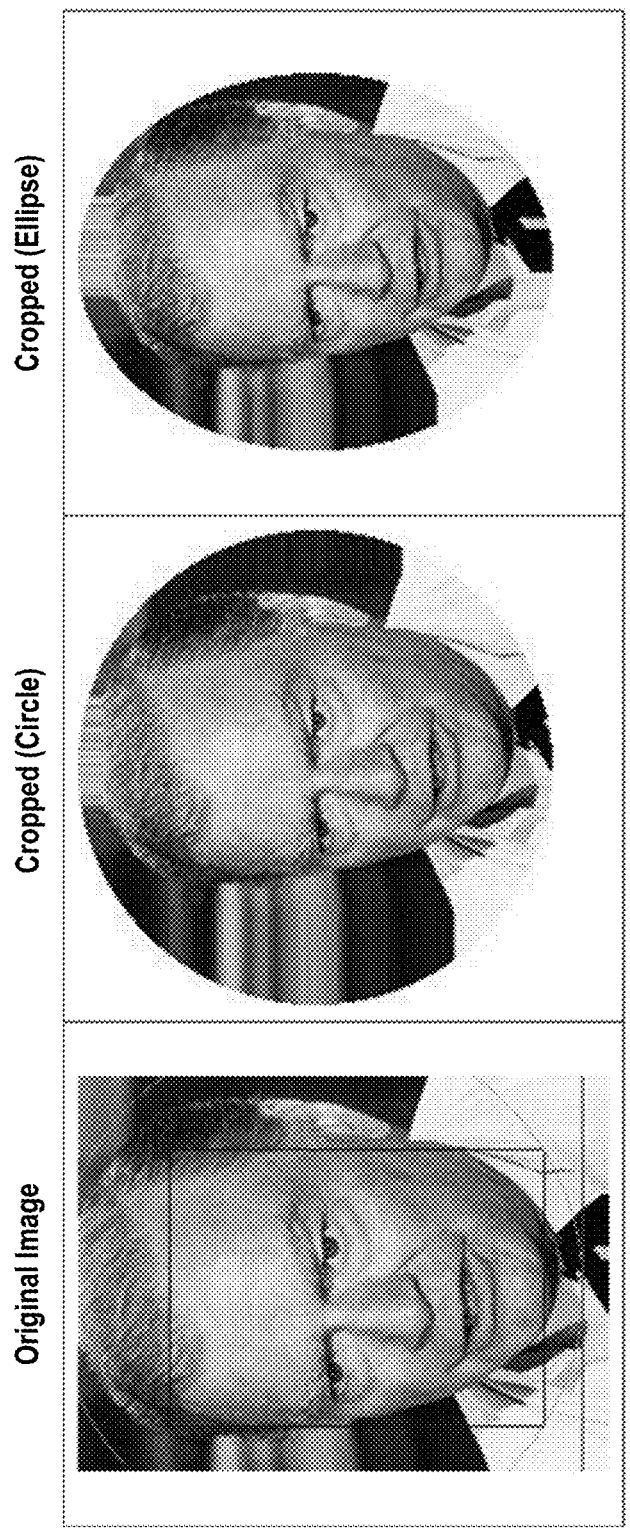

FIG. 9: Examples of Operation of the Invention, Illustrating Unwanted Pixel Synthesis Artifacts.

Figure 10:
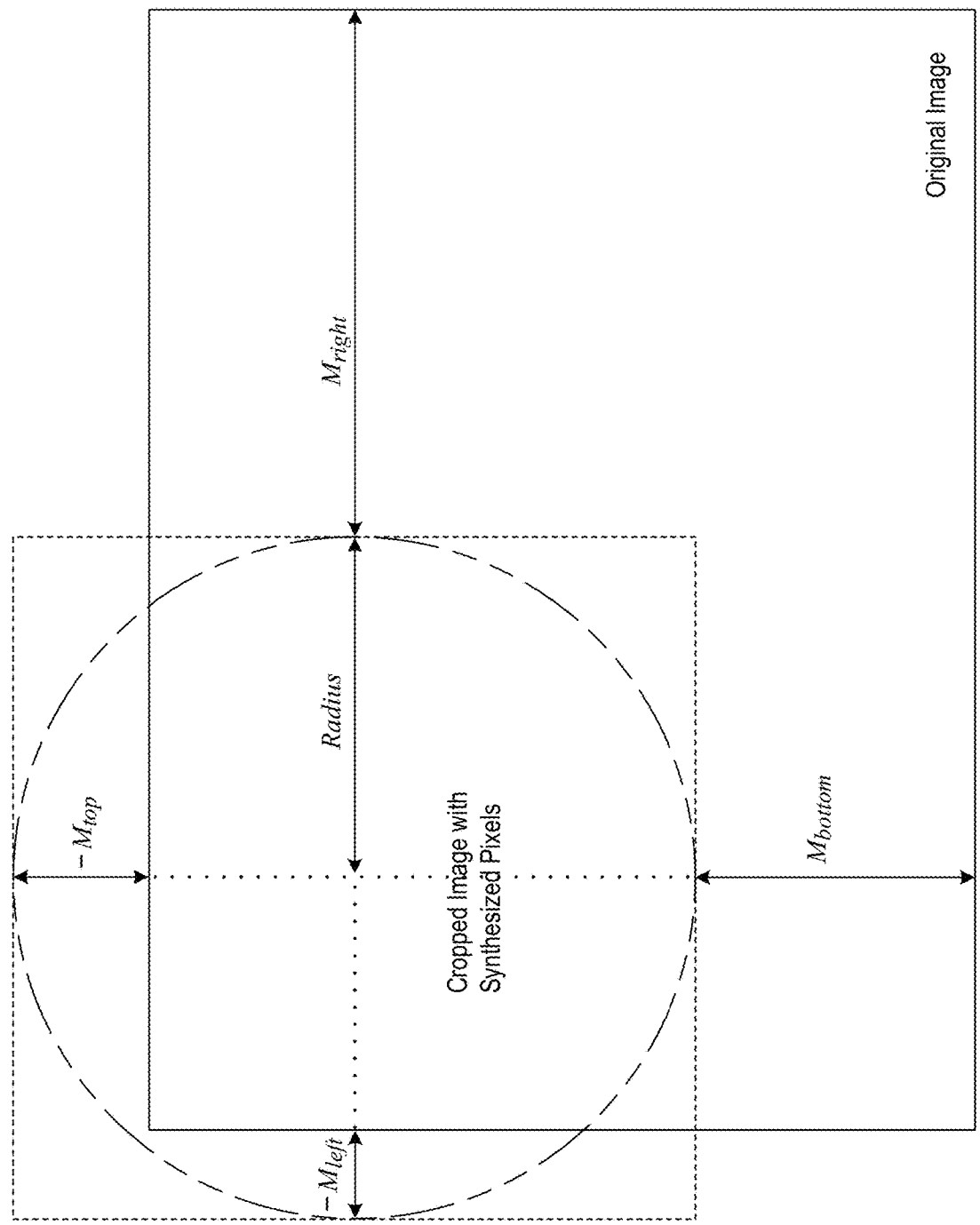

FIG. 10: Shifting of Extraction Region to Reduce Synthesis Artifacts. This diagram shows various geometric elements, and the meaning of associated variables and coordinates, related to the shifting of the extraction region to reduce unwanted pixel synthesis artifacts.

FIG. 11: Sequential Application of Low-Pass (Blurring) Filters. This diagram shows how a sequence of blurring filters is applied to selected regions of the image to reduce unwanted pixel synthesis artifacts.

Figure 12:
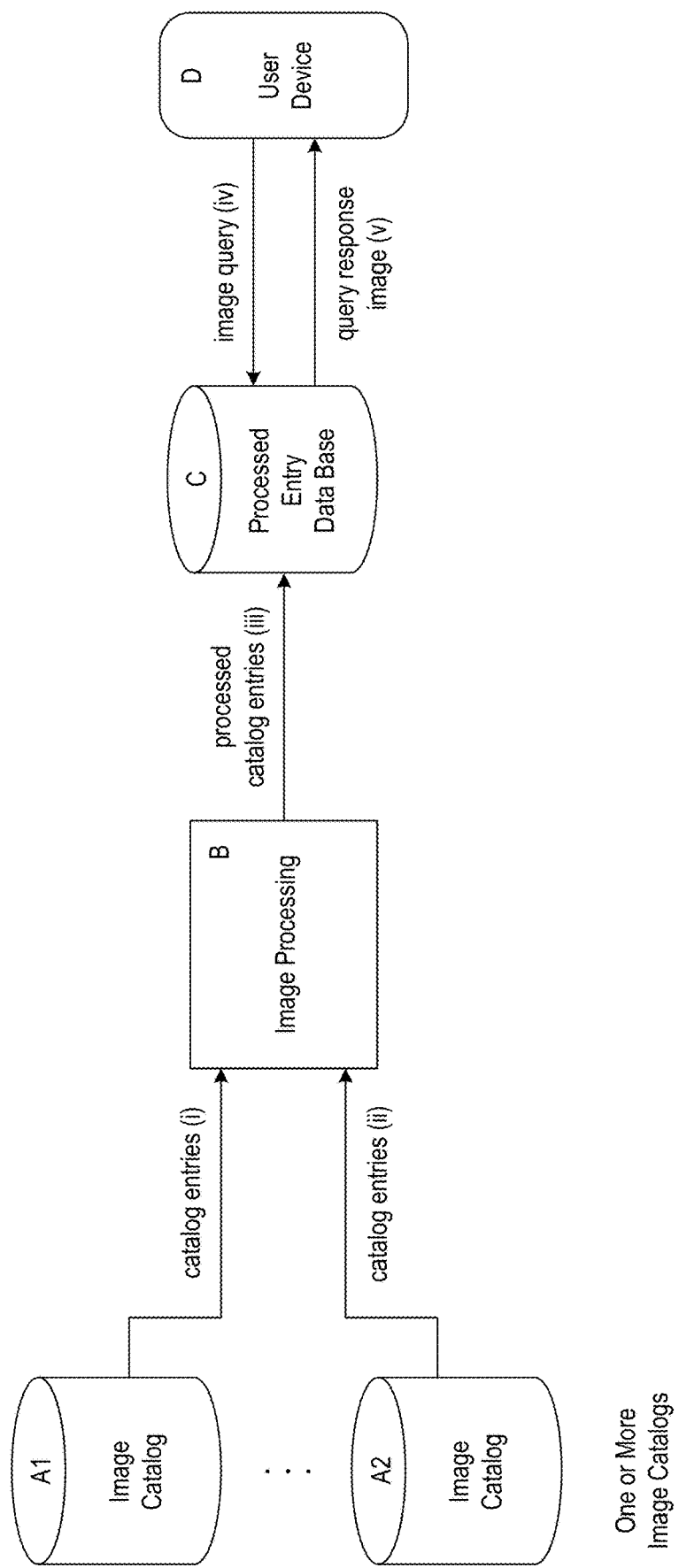

FIG. 12: Direct Retrieval System Architecture. This diagram shows a direct retrieval system architecture of the invention.

Figure 13:
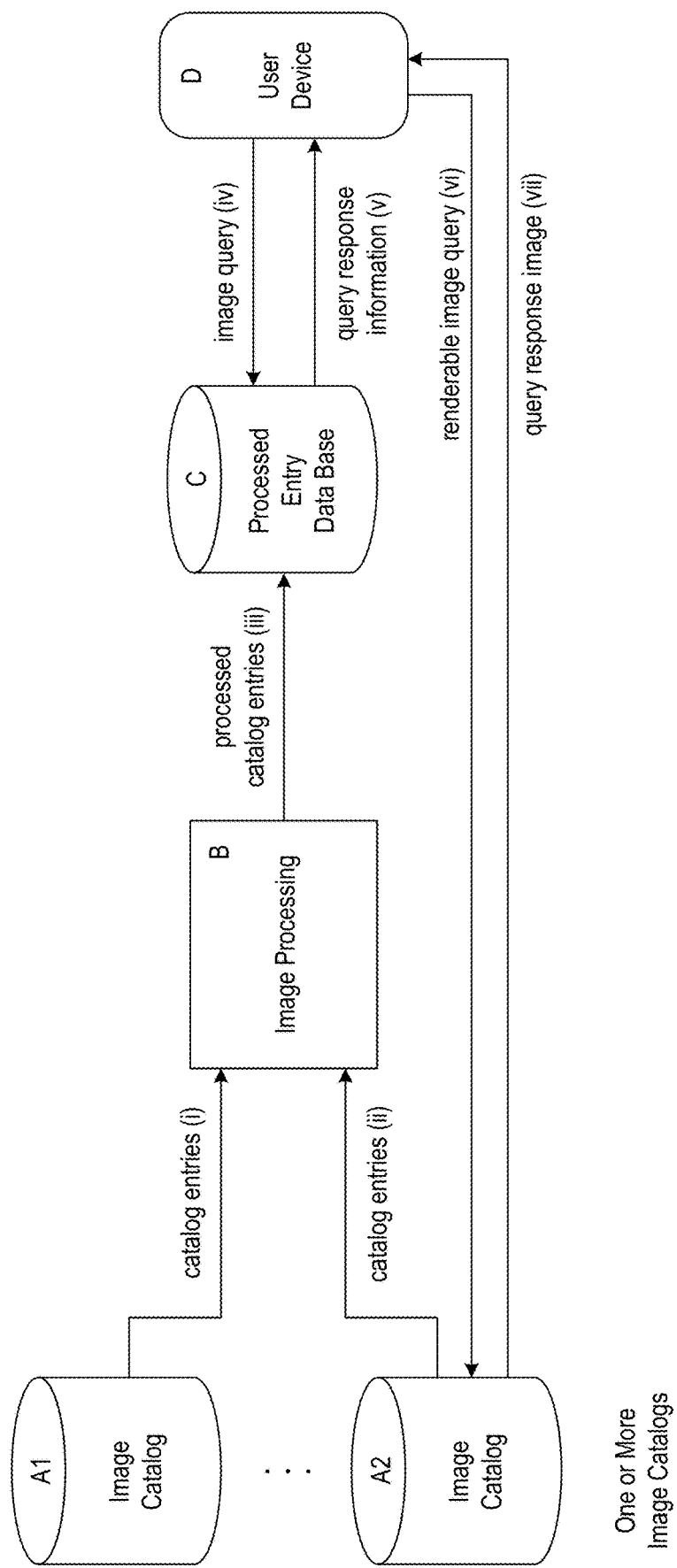

FIG. 13: Referenced Retrieval System Architecture. This diagram shows a referenced retrieval system architecture of the invention.

Figure 14:
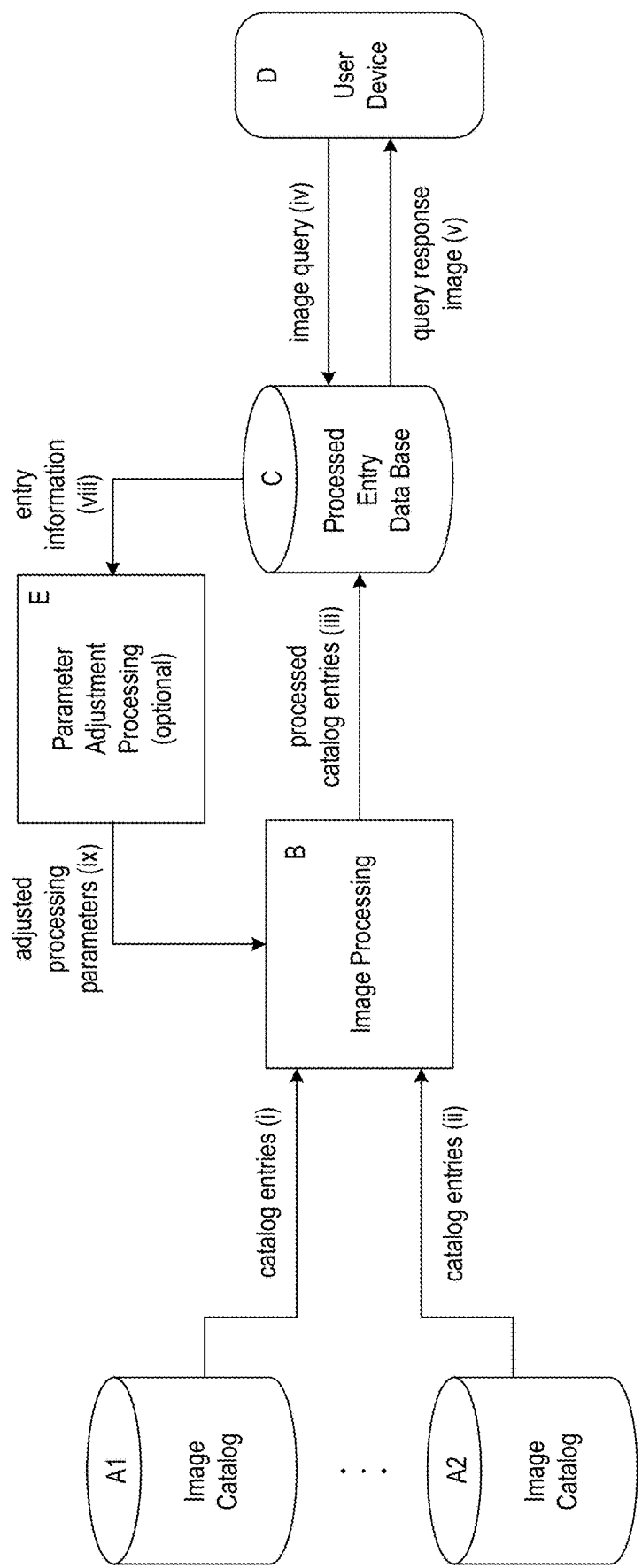

FIG. 14: Direct Retrieval System Architecture (With Parameter Adjustment). This diagram shows a direct retrieval system with parameter adjustment architecture of the invention.

Figure 15:
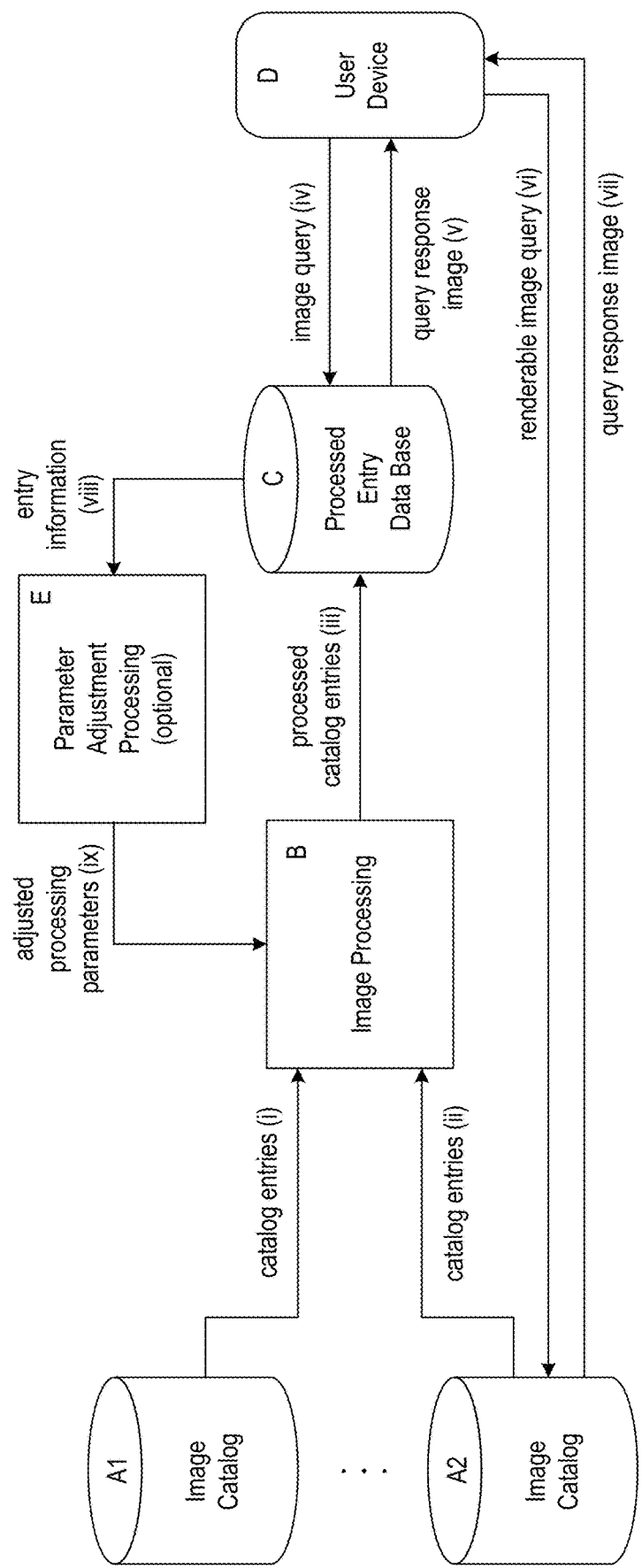

FIG. 15: Referenced Retrieval System Architecture (With Parameter Adjustment). This diagram shows a referenced retrieval system with parameter adjustment architecture of the invention.

Figure 16:
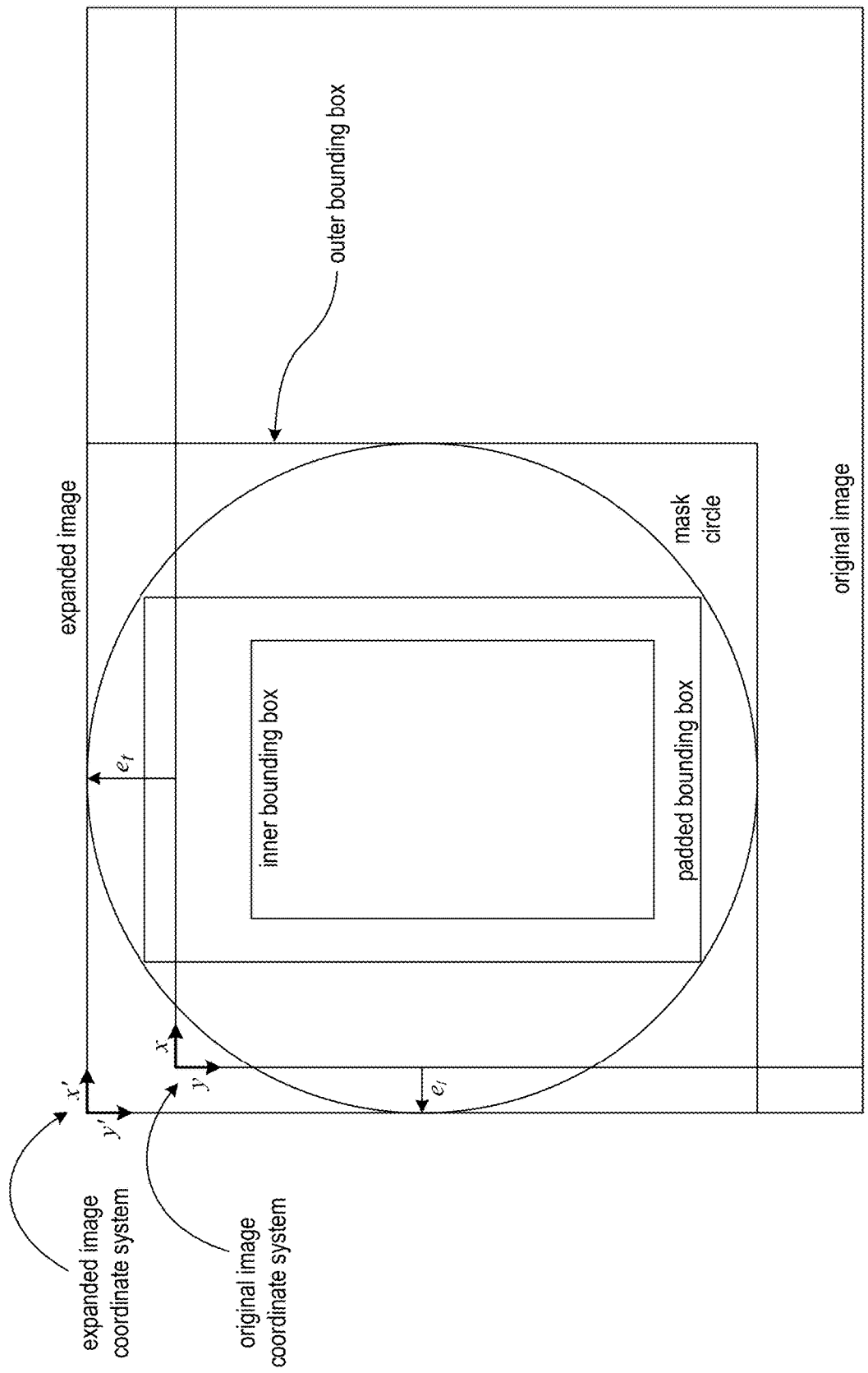

FIG. 16: Geometry and Coordinate Systems. This diagram shows geometric elements of the image expansion method, along with the original image and expanded image coordinate systems.

FIG. 17: Illustration of Centeredness. Shows geometry and parameters associated with computing Centeredness informant.

FIG. 18: Graph of Exemplary Desirability Function for Centeredness informant.

FIG. 19: Illustration of Zoom Levels.

FIG. 20: Functional Form and Graph of Desirability Function for Zoom informant.

FIG. 21: Functional Form and Graph of Desirability Function for Fill informant.

FIG. 22: Functional Form and Graph of Desirability Function for Scaling informant.

FIG. 23: Depiction of Roll, Pitch and Yaw Parameters. This diagram shows the meaning of these three parameters, to indicate the orientation of an entity head in three-dimensional space.

FIG. 24: Functional Form and Graph of Desirability Function for Yaw informant.

FIG. 25: Functional Form and Graph of Desirability Function for Face Sharpness informant.

FIG. 26: Functional Form and Graph of Desirability Function for Face Brightness informant.

FIG. 27: Functional Form and Graph of Desirability Function for Date Taken informant.

FIG. 28: Example of Effect of Determining a Cropping or Masking Region or Both (Alternate) and Expanding the Image (Alternate) Methods.

DETAILED DESCRIPTION OF THE INVENTION

In this section we provide a detailed description of the invention. This description is based on an exemplary version of the invention, which has been reduced to practice. However this is not the only possible version of the invention, and this description should not be regarded as limiting. We describe below variant architectures and implementations; however these are themselves likewise intended to be illustrative and should not be regarded as limiting.

Overview of Operation

The invention comprises both a system and specific methods utilized within this system. The word "invention" may therefore reference this entire system or any variants thereof, or any particular module, method or operation utilized therein, or any variants thereof.

The input to the invention may comprise one or more image catalogs, data bases or other repositories of images. The words "catalog," "data base" or repository may be used equivalently and interchangeably herein. For each input the operation or processing of the invention may yield as output a separate catalog, data base or other repository, or by virtue of merging or splitting may yield as output fewer or more catalogs, data bases or other repositories.

An image catalog or simply catalog may comprise at least one or more catalog entries. Each catalog entry or simply entry may itself comprise at least a collection of one or more images (the "image entry collection," "entry image collection," "image collection," "entry images" or if clear from context simply "images" or "entry"). Nominally the operation or processing of the invention proceeds by processing one or more catalogs, which entails processing one or more catalog entries, which entails processing one or more entry images. Thus the word "input" may constitute any of: one or more image catalogs, one or more entries within any one single catalog, or one or more images within any one single entry. Likewise the word "output" may constitute any of: one or more entire catalogs, one single entry or merged entry from one single catalog or from several catalogs, or any one or more single image. The element that constitutes an input or output will generally be clear from context, but if not the word "catalog," "entry" or "image" may be adjoined as needed, thus "input catalog," "output catalog" and so on. We may sometimes also refer to an output catalog, output entry or output image as a "processed catalog," "processed entry" or "processed image."

Nominally one input catalog yields one output catalog, one input entry yields one output entry and one input image yields one output image. However this is not a requirement as multiple input catalogs may be merged to yield a single output catalog and multiple input entries may be merged to yield a single output entry. Conversely a single input catalog may be split or replicated to yield multiple output catalogs, a single input entry may be split or replicated to yield multiple output entries, and a single input image may be split or replicated to yield multiple output images. Whether a particular catalog, entry or image constitutes an input or output will generally be clear from context, but if not the word "input" or "output" may be adjoined as needed. Moreover it is to be noted that the processing of a given image may comprise more than one step or process, and so the output image of one step or process may comprise the input image of another step or process.

To each entry may be associated an identifier of the subject of the aforesaid collection of images. We will sometimes use the terminology "entry subject" for this subject. This identifier, equivalently "subject identifier," may be a conventional proper name, like "George Clooney," or it may be an abstract alphanumeric identifier, which is associated with a conventional proper name through some external table or data source. Nominally each image in the aforesaid collection of images associated with an entry depicts the entry subject. The image may also depict additional subjects, as in the case of a group photo. In this case the subject identifier may comprise some or all the subjects that appear in the image. Also in this case multiple distinct subject identifiers may be associated with the image. For example, the image as a whole may be labeled with the name of a musical group as the subject identifier, but the names of individual group members may be associated with the same image. It may also comprise just the nominal subject of the image, even though images of other persons or entities may be present in the image.

The invention may operate upon the entries of one or more image catalogs. The processing of an input entry may optionally begin with analysis of the entry images to determine which one or several among them should be subject to further processing. We will refer to this action as "input pre-selection." Alternately there may be no input pre-selection and all of the entry images may be subject to further processing.

Each input entry image subject to further processing may be processed by the invention to generate one or more processed images. The processing of an image may comprise all or any of the following steps. The steps may be performed in the order presented here or in some other order. Two or more of the steps listed here may be combined into a single step. Likewise a single step listed here may be subdivided into two or more steps. Individual steps may be skipped or treated as optional. Moreover if implemented on a suitable device or devices some steps may be performed in parallel rather than serially. Additional steps not listed here may also be performed. (a) Face Extraction. Extracting one or several faces from the image; that is, determining a region of the image nominally comprising the face of an entity, typically but not necessarily rectangular, and typically but not necessarily a subset of the whole image. Such a region may be determined by its bounding box; that is, the coordinates within the image of the rectangle that comprises the region, if the region is rectangular. If several faces are extracted from the image their regions may overlap. In what follows we may refer to such a region, or the pixels that comprise the region, as an "extracted face"; the intended sense will generally be clear from context. An extracted face may be regarded as an initial version of a processed image, as determined by the invention from an input image. The Face Extraction step may also identify and locate specific facial features within the image, for example left eye, right eye, nose, mouth, left ear, right ear, as well as measures of image quality such as sharpness and brightness, as well as estimates of the orientation of the subject head in three-dimensional space such as pitch, roll and yaw, and possibly other estimates or measures as well. Properties, labels, information, enhancements, expansion and augmentation of any kind associated with an extracted face by any operation or action of the invention, notably but not exclusively including the steps recited here, may be regarded as incorporated within and part of any such processed image. Such data is often referenced as "metadata" and may be stored within or otherwise associated with the processed image or the entry as a whole by any suitable means. (b) Extracted Face Identification. Identifying any or all of the extracted faces; that is, labeling an extracted face or the image as a whole with a subject identifier, for example comprising one or more names or symbolic identifiers. Notably an extracted face and hence any processed image may include a subject identifier; that is, the subject identifier may be regarded as an element of the metadata of the processed image as described above. (c) Identity Verification. Verifying that the identity of at least one of the extracted faces matches the nominal identity associated with the input entry; that is, verifying that at least one extracted face corresponds to the nominal subject celebrity. In the event that this verification fails the input image may be marked for manual review as described below. (d) Determining a Cropping or Masking Region or Both. Determining and optionally applying a cropping or masking region for any or all of the extracted faces. Said cropping or masking region may be rectangular or may have a circular, elliptical or other non-rectangular shape. Moreover cropping and masking may each be performed; that is, determining and optionally applying a cropping region may then be followed by determining and optionally applying a masking region. Moreover these steps may be performed in the opposite order; that is first determining and optionally applying a masking region and then determining and optionally applying a cropping region. (e) Expanding the Image. Expanding the image by synthesizing pixel values for any or all of the cropping or masking regions if the boundary of any said cropping or masking region and hence the desired image extends beyond the input image; that is, where the mask extends beyond the boundaries of the input image, the processed image may be expanded, possibly by synthesizing the required pixels based on portions of the input image. (f) Determining a Cropping or Masking Region or Both (Alternate). Determining an alternate cropping or masking region for any or all of the extracted faces. Said alternate cropping or masking region may be rectangular or may have a circular, elliptical or other non-rectangular shape. (g) Expanding the Image (Alternate). Expanding the image by synthesizing pixel values for any or all of the alternate cropping or masking regions if the boundary of any said alternate cropping or masking region and hence the desired image extends beyond the input image. The processed image created by the steps of determining an alternate cropping or masking region and expanding the image by synthesizing pixel values for said alternate cropping or masking region may reduce or eliminate unwanted visual artifacts, compared with the processed image that may be created by other processing steps. (h) Marking for Manual Review. Marking for manual review any entry image or any processed image. A manual review may be performed for example for an entry image that does not yield an identified instance of the celebrity. In cases where there is a manual review step the invention may retain and/or utilize the result of the manual review for automatic adjustment of internal operating parameters of the invention to improve face extraction, identification or masking, or for some other reason. A manual review may also be performed for an entry image that does yield an extracted face that is labeled with a name or symbolic identifier that matches the subject celebrity, but said label is determined by some other means to be incorrect; that is, the extracted face is not in fact that of the subject. A manual review may also be performed on a periodic basis, for example once for every R processed images for some positive integer value R. Finally a manual review may be performed for some other reason.

These steps or any subset, reordering, subdivision, merging, recombination or augmentation thereof may yield one or more processed images. A processed image may comprise a collection of pixel values, nominally arranged in a rectangular array, which may be used to produce a rectangular image. It may additionally comprise a representation of an associated circular, elliptical or otherwise shaped mask which may be applied to the collection of pixel values to produce a circular, elliptical or otherwise shaped image.

The processed image may in and of itself be suitable for display on an electronic device, for reproduction in print media, for display, reproduction or rendering by other means, or for any other purpose as may be appropriate to the invention. We will refer to any such processed image, in any variant, and possibly inclusive of additional information, as a "direct output."

Alternately the processed image may not itself be renderable, but may comprise a reference and optional instructions to yield a renderable image. That is, the processed image may for example comprise an identifier of an image, existing within a catalog, and optionally parameters or other instructions suitable for some other computational device or process to operate upon the aforesaid image existing within a catalog, for example comprising any or all of the steps of image processing enumerated above, to yield a final renderable image, suitable for display to a user or for any other purpose as may be appropriate to the invention. One example of such an identifier would be a Uniform Resource Locator ("URL"), sometimes colloquially called "web address," which may be used to retrieve an image over the Internet or other similar communication network. We will refer to any such output, in any variant, and possibly inclusive of additional information, as a "reference output."

It is to be understood that "direct output" and "reference output" are neither exclusive nor exhaustive; one and the same output may qualify as both a direct output and a reference output. That is, a direct output may be provided for example to an appropriate device or process for display or rendering or to a system for further processing, or it may be stored in a suitable repository, either in processed form or optionally along with parameters of other instructions to guide further processing, and thereafter serve as a reference output. Notably the output of the invention may comprise either direct outputs or reference outputs. Or the output may comprise either kind of output for various input entries—that is, either a direct output or a reference output—or both kinds of output, for one and the same input entry, or any other kind of output, combining the operation of any processing steps.

The processing of the entry images of an input entry to yield output images may be followed by an analysis of said output images to determine which one or several among them shall be retained or otherwise preferred, or attribute to them some quality or preference score, or to rank them in order of preference. Methods for performing this operation are discussed below in the "Image Selection" section. We will refer to this action as "output post-selection." Alternately no output post-selection may be performed and all of the output images may be retained.

It should be noted that the image selection process may also be interpolated within the sequence of steps detailed above, at any point where the values of the necessary informants become available. This requires a modest modification of the architecture, wherein the sequence of steps may be suspended for the image entry collection, all partially processed images of the entry may be ranked or otherwise evaluated by the image selection methods detailed below, and one or more of the partially processed images then selected for further processing.

The output images generated from an input entry by the processes described above nominally comprise the "output entry image collection," "output image collection" or simply "output images." The output entry image collection, optionally with an associated image identifier and possibly other associated data, for example the aforementioned preference marking or quality or preference scores, may comprise an "output entry."

A single input entry may yield or contribute output images to one or several output entries. A single input entry may contribute to several output entries when one or more of the input entry images yields extracted faces that correspond to distinct entities. In such cases the extracted faces may be collected into distinct entries in the output catalog.

FIG. 2 shows an overview of one possible implementation of the invention. We proceed to describe in greater detail methods for implementing certain of these steps.

1. Face Extraction

In the Face Extraction step an image of the image entry collection may be processed to extract a face region. The result of extracting a face region may be a bounding box; that is, a portion of the processed image may be determined to comprise a face. As such a region is typically a rectangle within the subject image, it is typically referred to as a "bounding box." We will hereafter refer to this region as a "bounding box," even though in full generality the extracted face region may not be a rectangle. We may also refer to this as the "raw bounding box," as in later steps this may be expanded to a "padded bounding box" or even an "outer bounding box," depending upon the particular variant of the invention, or the particular operations performed upon any given input.

A single Face Extraction step may yield 0, 1 or more than 1 extracted faces. In the event that 0 extracted faces are returned then a manual review of the image may be performed. In the event that exactly 1 extracted face is returned then typically further processing is performed on this extracted face, whether or not the Extracted Face Identification step labels the extracted face as that of the subject celebrity. However if the extracted face is not identified as that of the subject celebrity then a manual review of the image may still be performed. If the Face Extraction step yields more than 1 extracted face then each extracted face may be separately processed by the remaining steps of image entry processing. However if the Face Extraction step yields more than 1 extracted face, but only one of the extracted faces is identified by the Extracted Face Identification step as that of the subject celebrity, then typically further processing is performed only on the extracted face corresponding to the subject celebrity. However further processing may still be performed on other extracted faces, if they are identified as corresponding to other celebrities; those output images are later merged with the output entry of the corresponding celebrity.

2. Extracted Face Identification

In the Extracted Face Identification step an extracted face may be labeled with a subject identifier, which thereafter comprises part of the processed image. A subject identifier may comprise a conventional name or a symbolic identifier.

One version of the invention may perform the Face Extraction step and the Extracted Face Identification step via a Face Region Extraction and Person Identifying Module (hereafter "FREPI Module"). This FREPI Module may perform all or some of: Face Extraction and Extracted Face Identification; that is, these steps may be merged into a single Face Extraction and Extracted Face Identification step. Alternately this module may be divided into two separate modules, a Face Region Extraction Module and a Person Identifying Module. If so then the specific steps of extracting a face region and identifying a person may be performed by these separate modules. Moreover as described elsewhere in this document, the FREPI module, or the aforementioned separate modules, or some other module or modules, may also determine additional information and data associated with an extracted face, the image as a whole, or both, for example the identity and location of specific facial features, measures of image quality such as sharpness and brightness, measures of the orientation of the subject head such as pitch, roll and yaw, and other measures as well.

Note that more than one face may be present in the input image. Thus multiple bounding boxes, and multiple subject identifiers, may be returned by the Face Extraction step and Extracted Face Identification Step, or the merged Face Extraction and Extracted Face Identification step The FREPI Module may be an integrated element of the invention or may exist as a separate entity. If it exists as a separate entity it may be accessible via an Internet-accessible application programmer interface or "API." This separate entity may operate as a commercial service.

One such example commercial service is "AWS Rekognition™," which we may also reference simply as "Rekognition™." The Rekognition™ API, which may be regarded as exemplary but not defining of the functions, services and characteristics of a typical FREPI module, is documented in the online resource "Amazon Rekognition Documentation," which at this writing may be accessed via the URL https://aws.amazon.com/rekognition?id=docs_gateway. Rekognition™ provides two API calls that can detect faces: detect_faces and recognize_celebrities. Both calls may return the same set of faces, with one difference being that for each returned face, recognize_celebrities either assigns a celebrity name to the returned face or declares it an "unknown face." For recognized faces, any or several of the nominal celebrity name, an IMDb™ link, an Amazon™ ID or some other suitable identifier may be returned.

The response generated by the FREPI module for any particular image may be cached locally. In this case the cache entry may be labeled and searchable by the URL or other reference or name used to retrieve or identify the image, or alternately or possibly in addition the md5sum or other checksum of the image file. In this manner repeated presentations of the same image to the FREPI module will avoid repeated processing of the said same image.

The face detection function of typical FREPI modules generally works well. However the face identification function may not be not reliable. For example, in a test of the previously mentioned Rekognition™ instance of a FREPI module, out of a collection celebrity images tested, the correct celebrity was identified in only approximately 75% of the test images. The celebrities not identified included George Clooney. Of the failing images, in approximately 75% of these cases the Rekognition™ system returned "unknown face"; in the remainder of failing cases the wrong celebrity was identified. However in all tested images, the Rekognition™ system detected only one face in the subject image and the bounding box for that face was correct.

Rekognition™ was also tested on a number of images containing multiple people. In each case it detected all faces that were reasonably prominent in the image, and identified approximately 70% of the celebrities in the images. So, if Rekognition™ identifies a face as the celebrity purported to be in the image, then it is highly probable the face detected is that celebrity. However, neither the failure of Rekognition™ to provide any identity, nor the return by Rekognition™ of an identity that differs from that of the purported celebrity, is not a reliable indicator that the image is not that of the purported celebrity.

2. Determining a Cropping or Masking Region or Both

The invention may crop a given image to the bounding box returned by the FREPI module (also denoted the "raw bounding box"), to a "padded bounding box" or to an "outer bounding box." The invention may also mask a given image. The invention may also both crop and mask a given image, in any order. With respect to cropping and masking, the word "determining" may be interpreted as "determining and performing."

The action of the invention with respect to cropping, masking or both cropping and masking may depend upon the characteristics of the particular FREPI module, upon whether an optional masking step is desired. or upon some other criteria. In this section we explain one method for identifying a circular or elliptical masking region from the image and the extracted face.

Determining a circular masking region. We now explain a method for determining a circular masking region for an extracted face from the bounding box returned by the FREPI module. The discussion will reference FIG. 3. Dimensions and coordinates as depicted in FIG. 3 may be given in pixel indices as discussed below.

The FREPI module may return a bounding box, also denoted herein as the raw bounding box, also denoted herein as the inner bounding box. In FIG. 3 this is denoted as the raw bounding box. The raw bounding box may be expressed by the 4 parameters $\hat{i}_l, \hat{i}_r, \hat{i}_t, \hat{i}_b$. These parameters denote respectively the position of the left boundary, right boundary, top boundary and bottom boundary of the inner bounding box. The FREPI module may return each of these parameters as a floating point number in the range 0 to 1, which need to be multiplied by the height h or width w of the image to convert into pixel indices. (As the source image is typically not square the conversion may be different in the horizontal and vertical directions.) Thus typical formulae for converting values returned by the FREPI module in the range 0 to 1 to pixel indices are:

$$i_l = w \times \hat{i}_l$$

$$i_r = w \times \hat{i}_r$$

$$i_t = h \times \hat{i}_t$$

$$i_b = h \times \hat{i}_b.$$

Here $i_l, i_t, i_r, i_b$ may denote respectively the left boundary, top boundary, right boundary and bottom boundary of the inner bounding box. If the result of any of these multiplications is not a whole number then typically the result is rounded to the nearest whole number corresponding to the index of a pixel that lies within the input image. Except as explicitly noted otherwise below all of the following parameters may be expressed in units of pixel indices; however other units may be possible in which case appropriate modifications may be made by those familiar with the art to the discussion, formulae and procedures given here.

Optional padding may then be added to get the padded bounding box according to the following formulae:

$$p_l = i_l - b_l$$

$$p_t = i_t - b_t$$

$$p_r = i_r + b_r$$

$$p_b = i_b + b_b$$

Here $b_l$, $b_t$, $b_r$, $b_b$ may denote respectively the size of the padding area to be adjoined to the left boundary, the top boundary, the right boundary and the bottom boundary of the inner bounding box; and $p_l$, $p_t$, $p_r$, $p_b$ may denote respectively the left boundary, top boundary, right boundary and bottom boundary of the padded bounding box computed by the above formulae.

Typically the padding parameters $b_l$, $b_t$, $b_r$, $b_b$ are computed as fractions of the height or width of the inner bounding box. That is, let the height of the inner bounding box be determined as $h_i=|i_t-i_b|$ and let the width of the inner bounding box be determined as $w_i=|i_l-i_r|$. Then the aforementioned padding parameters may be determined by the following formulae:

$$b_l=\alpha_l \cdot w_i$$

$$b_r=\alpha_r \cdot w_i$$

$$b_t=\alpha_t \cdot h_i$$

$$b_b=\alpha_b \cdot h_i$$

Here $\alpha_l$, $\alpha_r$, $\alpha_t$, $\alpha_b$ are parameters that express the fraction of the inner bounding box width or inner bounding box height as appropriate that are to be used to compute respectively the indicated left, right, top and bottom padding parameters. These parameters are typically dimensionless real numbers and are therefore not expressed in units of pixel indices or any other unit. However these parameters may also colloquially be expressed as percentages; in such cases as known to those familiar with the art an a value of 20% for example corresponds to a dimensionless real number value $\alpha=0.2$. These parameters may be experimentally determined and typically lie in the range 0 to 1 inclusive. One preferred implementation of the invention uses $\alpha_t=0.2$ and $\alpha_b=\alpha_l=\alpha_r=0$ but other values are possible.

Next the parameters of the circle enclosing the padded bounding box, hereafter denoted the "mask circle," may be found. The mask circle is depicted in FIG. 3 by the dash-dotted line that intersects the four corners of the padded bounding box. The mask circle defines the desired circular mask. The circularly masked region is ultimately the region that we want to display. The mask circle may be defined by its center coordinates denoted below $c_x$ and $c_y$ and radius r which may be determined as follows.

$$\text{center}(c_x, c_y) = \left(\frac{p_l+p_r}{2}, \frac{p_t+p_b}{2}\right)$$

$$\text{radius } r = \sqrt{\left(\frac{p_b-p_t}{2}\right)^2 + \left(\frac{p_r-p_l}{2}\right)^2}$$

From the circle enclosing the padded bounding box the invention may calculate the parameters of the outer bounding box according to the following formulae:

$$o_l=c_x-r$$

$$o_t=c_y-r$$

$$o_r=c_x+r$$

$$o_b=c_y+r$$

Note that this procedure may yield both an outer bounding box, which comprises a rectangular (more precisely square) region that may be used to crop the input image and also a circular mask that may be used to mask the input image; the two actions of cropping and masking may be used together to generate the output image. However the circular mask as determined here may be applied on its own to the input image to generate the output image.

3. Expanding the Image

It is possible that a circular mask region as determined above, or an elliptical mask region as discussed below, may extend beyond the edge of the input image. In this event the invention may compensate by changing the mask circle center, radius or both. Alternately it may expand the image to provide pixel values at least within the mask circle. The effect of both options are discussed in the Results section. The algorithm below details one expansion algorithm. As any required image expansion may take place in this step, the actual cropping, masking or both of the image may likewise take place in this step.

The image of height h and width w may be expanded to the top, bottom, left, and right by $e_t$, $e_b$, $e_l$, and $e_r$ pixels respectively.

$$e_t=\max(-o_t,0)$$

$$e_b=\max(o_b-h,0)$$

$$e_l=\max(-o_l,0)$$

$$e_r=\max(o_r-w,0)$$

The circle center, and outer bounding box may then be modified as follows:

$$(c_x',c_y')=(c_x+e_l,c_y+e_t)$$

$$o_t'=o_t+e_t$$

$$o_b'=o_b+e_t$$

$$o_l'=o_l+e_l$$

$$o_r'=o_r+e_l$$

The primed quantities in these formulae, and in the formulae below, reference the coordinate system of the expanded image. For clarity the horizontal and vertical coordinates in the coordinate system of the expanded image are denoted as x́ and ý respectively and represent pixel index values in this new coordinate system. The relationship between the coordinates of the input image and the coordinates of the expanded image is given by the equations x'=x+$e_l$ and y'=y+$e_t$, where $e_l$ and $e_t$ are as defined above. This relationship is depicted graphically in FIG. 16.

Since a circular mask may be later applied to the image, it is necessary to synthesize (i.e. assign the value of) only those pixels that fall within the circle. (Here the value of a pixel means its numerical parameter values in RGB color space, YUV color space, or any other parameterization that determines its chrominance and luminance.) However following the arc of the mask circle may be computationally expensive so a simple solution may be to calculate the intersection of the circle with the outer edge the original image and assign values to all pixels in that region. FIG. 4 shows an example of an image expanded to the top and left, with the hatched regions being the regions of pixels to synthesize.

To determine the value to assign to a pixel beyond the boundary of the original image one method, and one preferred method of the invention, is boundary extension. This has the following meaning: For a pixel that lies above the top boundary of the original image, but with an x coordinate that lies within the left and right boundaries of the original image, assign to that pixel the value of the pixel that lies on the top edge of the original image, at the same x coordinate. For a pixel that lies below the bottom boundary of the original image, but likewise with an x coordinate that lies within the left and right boundaries of the original image, assign to that pixel the value of the pixel that lies on the bottom edge of the original image, at the same x coordinate. For a pixel that lies to the left of the left boundary of the original image but with a y coordinate that lies within the top and bottom boundaries of the original image, assign to that pixel the value of the pixel that lies on the left edge of the original image, at the same y coordinate. Finally for a pixel that lies to the right of the right boundary of the original image but with a y coordinate that lies within the top and bottom boundaries of the original image, assign to that pixel the value of the pixel that lies on the right edge of the original image, at the same y coordinate. However other synthesis methods, and refinements of those just described, may also be used.

The method as explained in prose above may be expressed in the following formulae. In these formulae the expressions denoted "x'-range" and "y'-range" give ranges of the pixel index values, in the expanded image coordinate system, in the horizontal and vertical dimensions respectively to which the associated synthesis equations apply. Likewise, the formulae make use of circle center co-ordinates, $(C'_x, C'_y)$, in the expanded image. The synthesis equations determine the value of the pixel, found within the original image, to assign to the pixel located at pixel index values x' and y' in the expanded image. The relevant formulae are:

Top Expansion y'-range $0 \leq y' < e_t$ x'-range $(c_x' - \sqrt{(r^2-(e_t-c_y')^2)}) \leq x' \leq (c_x' + \sqrt{(r^2-(e_t-c_y')^2)})$ and $e_l \leq x' < e_l + w$ synthesis pixel(x',y')=pixel(x',$e_t$)

Left Expansion x'-range $0 < x' < e_l$ y'-range$(c_y' - \sqrt{(r^2-(e_l-c_x')^2)}) \leq y' \leq (c_y' + \sqrt{(r^2-(e_l-c_x')^2)})$ and $e_t \leq y' < e_t + h$ synthesis pixel(x',y')=pixel($e_l$,y')

Bottom Expansion y'-range $e_t+h \leq y' < e_t+h+e_b$ x'-range$(c_x' - \sqrt{(r^2-(e_t+h-c_y')^2)}) \leq x' \leq (c_x' + \sqrt{(r^2-(e_t+h-c_y')^2)})$ and $e_l \leq x' < e_l + w$ synthesis pixel(x',y')=pixel(x',$e_t+h-1$)

Right Expansion x'-range $e_l+w \leq x' < e_l+w+e_r$ y'-range$(c_y' - \sqrt{(r^2-(e_l+w-c_x')^2)}) \leq y' \leq (c_y' + \sqrt{(r^2-(e_l+w-c_x')^2)})$ and $e_t \leq y' < e_t + h$ synthesis pixel(x',y')=pixel($e_l+w-1$,y')

More complicated synthesis procedures such as an averaging filter may provide a blurring effect, however in most cases the method of boundary edge extension doesn't produce any obviously unpleasant artefacts.

For images where the circle encloses a corner of the original image, specifically for each corner of the original image where the distance from the center of the circle to the corner is less than the radius of the circle, there exists a region of pixels outside the bounds of the original image, but ultimately visible in the processed image, for which the pixel values are not defined by the above equations. The following formulae define the pixel values for such regions and are to be executed after executing all applicable of the Top, Bottom, Left, and Right Expansions described above:

Top Left Corner Expansion $$x'\text{-range} \quad \left(c'_x - \sqrt{\left(r^2 - \left(e_t - c'_y\right)^2\right)}\right) \leq x' < e_l$$

$$y'\text{-range} \quad \left(c'_y - \sqrt{\left(r^2 - \left(x' - c'_x\right)^2\right)}\right) \leq y' < e_t$$

synthesis $\text{pixel}(x', y') = \alpha \times \text{pixel}(x', e_t) + (1 - \alpha) \times \text{pixel}(e_l, y')$ $$\alpha = \frac{e_t - y'}{e_l - x' + e_t - y'}$$

Top Right Corner Expansion $$x'\text{-range} \quad e_l + w \leq x' < \left(c'_x + \sqrt{\left(r^2 - \left(e_t - c'_y\right)^2\right)}\right)$$

$$y'\text{-range} \quad \left(c'_y - \sqrt{\left(r^2 - \left(x' - c'_x\right)^2\right)}\right) \leq y' < e_t$$

synthesis $\text{pixel}(x', y') = \alpha \times \text{pixel}(x', e_t) + (1 - \alpha) \times \text{pixel}(e_l + w - 1, y')$ $$\alpha = \frac{e_t - y'}{x' - (e_l + w - 1) + e_t - y'}$$

Bottom Left Corner Expansion $$x'\text{-range} \quad \left(c'_x - \sqrt{\left(r^2 - \left(e_t - c'_y\right)^2\right)}\right) \leq x' < e_l$$

$$y'\text{-range} \quad e_t + h \leq y' < \left(c'_y + \sqrt{\left(r^2 - \left(x' - c'_x\right)^2\right)}\right)$$

synthesis $\text{pixel}(x', y') = \alpha \times \text{pixel}(x', e_t + h - 1) + (1 - \alpha) \times \text{pixel}(e_l, y')$ $$\alpha = \frac{y' - (e_t + h - 1)}{e_l - x' + y' - (e_t + h - 1)}$$

Bottom Right Corner Expansion $$x'\text{-range} \quad e_l + w \leq x' < \left(c'_x + \sqrt{\left(r^2 - \left(e_t - c'_y\right)^2\right)}\right)$$

$$y'\text{-range} \quad e_t + h \leq y' < \left(c'_y + \sqrt{\left(r^2 - \left(x' - c'_x\right)^2\right)}\right)$$

synthesis $\text{pixel}(x', y') =$ $\alpha \times \text{pixel}(x', e_t + h - 1) + (1 - \alpha) \times \text{pixel}(e_l + w - 1, y')$ where $\alpha = \dfrac{y' - (e_t + h - 1)}{x' - (e_l + w - 1) + y' - (e_t + h - 1)}$ Conceptually the above equations synthesize pixels in the corner regions where there are no pixels to directly extrapolate from. The above formulae synthesize pixels by computing a weighted sum of the closest already synthesized pixel in the horizontal and vertical dimensions. The closer the to-be synthesized pixel is to the component pixel in the weighted sum the higher the weighting for that component pixel. This method avoids introducing sharp edges in the synthesized portion of the image.

One variant of this method, well suited to small images, is to synthesize all expanded regions vertically and horizontally (ie. only ignore corners) rather than restricting the synthesis to the region defined by the mask circle. In this variant, corners may be estimated using the same formulae above, however not restricting the range to fall within the circle. This method may also be used in the case where no circular mask is to be applied; rather the image is only to be cropped to an outer bounding box. A further variant is to synthesize pixels in rectangular regions where the union of rectangular regions is a superset of the pixels required to be synthesized. An example this variant is shown in FIG. 4, where the points of intersection between circle and original image are used to establish rectangular regions, rendered as hatched rectangles, to the top and left. This variant is advantageous in that the arc of the circle need not be strictly followed, avoiding computationally expensive operations, while also avoiding unnecessary synthesis of many pixels that fall outside the circular mask.

Ellipse as an alternative to a circle. As an alternative to a circular region, a method for selecting an elliptical region that includes the subject face comprises another variant of the invention. One advantage of cropping to an elliptical region rather than a circular region is that since faces are generally oval (elliptical) rather than circular, an elliptical region will generally include the entire face, but less extraneous background detail. Thus the image within the elliptical region may be easy to recognize. However because an ellipse with a vertical major axis is less wide than a circle of the same height, it may be possible to display more ellipses than circles in a row, within the same horizontal space FIG. 5 illustrates extracting an elliptical region from the bounding box. In this approach a circular region may first be extracted as per FIG. 3, however different padding values may be chosen. The major axis of the ellipse may then be taken as the circle radius (which may again be different to the circular region selected due to padding) and the minor axis a constant multiple k of the major axis. The value of the constant k is typically experimentally determined for a given instance of the invention. In one preferred implementation of the invention the value k=0.8 is used. The axes may be kept in the same aspect ratio for consistency should images be displayed alongside each other.

Alternately, the outer bounding box may be computed from the major and minor axes of the ellipse, rather than from the radius of the original circle. This may result in a narrower outer bounding box. The methods discussed above for expanding an image to which a circular mask may be applied may likewise be applied to the case of an elliptical mask as discussed here, with suitable modifications made by one skilled in the art.

4. Image Selection

The invention can also be used to pick the best of several alternative images available for a single celebrity. The method of achieving this is to compute a desirability score, D for each image associated with each celebrity, which ranks each image in terms of preferred visual appearance. The image with the lowest desirability score has the least preferred visual appearance and the one with the highest score is the one with the most preferred visual appearance. The desirability score is computed as a weighted sum of visual desirability informants, where each informant is a number in the range 0 to 1.0, with 0 indicating extremely low desirability of the image for a given informant and 1.0 indicating extremely high desirability for the informant. The weights are chosen according to the relative importance of each informant to the overall desirability. This can be done manually, or via a training process described later.

Visual desirability informants may include but are not limited to the following:

Centeredness: how well the bounding box of the face is centered within the processed celebrity image. The optimal position is in the exact center of the processed image. Centeredness may be measured as the distance of the center of the face bounding box from the center of the entire processed image, expressed as a ratio of the total distance from the center of the processed image to the corner. FIG. 17 depicts the geometry and parameters associated with computing this informant. FIG. 18 is a graph of the associated Centeredness desirability function.

Zooming: how optimally the processed image frames the face bounding box. Zooming too close (such that portions of the face are cropped) and too far away (such that too much of the processed image is devoted to non-face pixels) are both considered non-optimal. Zooming may be measured using the ratio of the area of the face bounding box in the processed image to the total area of the processed image. Note that this ratio can be less than 1.0 (if the face portion doesn't take up the entire processed image) or greater than 1.0 (if large portions of the face are cropped out of the final image). The optimal zoom ratio is considered to be 0.8-1.2, with values outside this range being increasingly less desirable. FIG. 19 illustrates the meaning of various exemplary Zoom levels. FIG. 20 is a graph of the associated Zoom desirability function.

Fill: the degree of expansion that was required to fill in the edges of the processed image. The ideal amount of fill is none, and the more fill added the less desirable the image. Thus the desirability function for Fill may be calculated as the ratio of the area of the processed image that is not filled to the total area of the processed image. FIG. 21 is a graph of the associated Fill desirability function.

Scaling: how much the image had to be scaled to achieve the final size of the processed image. Any level of upscaling (scaling>1) is undesirable because it reduces the visual clarity of the image, and the greater the upscaling the less desirable the image. Scaling may be measured using the ratio of the width of the original face bounding box to the width of the face bounding box in the final processed image. FIG. 22 is a graph of the associated Scaling desirability function.

Yaw: how well the celebrity is facing directly towards the viewer. The ideal yaw is around 0°. The worst yaw is around ±180°. A measured yaw angle is subject to a desirability function such that yaws in the range −30° to 30° have a desirability close to 1.0; the desirability gradually drops to around 0.5 for values of ±50°, and finally drops down to around zero once it gets past ±90°. This can be achieved with a pair of sigmoid functions as described in the definition of the desirability function $D_{Yaw}$ below. FIG. 23 depicts the meaning of roll, pitch and yaw parameters. FIG. 24 is a graph of the associated Yaw desirability function.

Matching Name. If FREPI reports a name for the celebrity that matches the desired celebrity, then the image is highly desirable. A missing name is less desirable, and a non-matching name is very undesirable.

Face Sharpness. Images where the face bounding box are more sharply-focused are more desirable and less-sharply focused faces are less desirable. Based on a sharpness measure returned by FREPI system, scaled to the range 0 (least sharp) to 1 (most sharp). Faces above the minimum acceptable sharpness range get a desirability value of 1 and those below this range get a value that quickly decays to zero. FIG. 25 is a graph of the associated Face Sharpness desirability function.

Face Brightness. Images where the face region is too dim or likewise too bright are very undesirable. Based on a brightness measure returned by FREP system, scaled to the range 0 (least bright) to 1 (brightest). Measured as a piecewise function, where faces within the acceptable brightness range get a desirability value of 1 and those outside the acceptable brightness range (too dim or too bright) get a value that quickly decays to zero. FIG. 26 is a graph of the associated Face Brightness desirability function.

Date Taken. Images taken closest to a particular reference date are preferable to ones further away in time. The reference date could either be the current date, or the release date of an associated movie that the celebrity image will be shown with. Date Taken desirability function may be computed as the negative exponential of the absolute value of the difference between the reference date (referencedate) and the date the picture was taken (datetaken), each measured in years or fractions thereof, and scaled such that values greater than 20 years approach a desirability of 0. FIG. 27 is a graph of the associated Date Taken desirability function.

The exemplary visual desirability informants listed above may be computed as follows:

$$D_{Centeredness} = \frac{R - \Delta}{R} = 1 - \frac{\Delta}{R}$$

where $\Delta$ is the distance between the center of the face bounding box and the center of the processed image boundary and where $R$ is the distance between the center of the processed image bounding box and any corner thereof.

$$D_{Zoom} = \begin{cases} e^{5(zoom - z_{min})} & zoom < z_{min}, \\ 1.0 & z_{min} \leq zoom \leq z_{max}, \\ e^{5(z_{max} - zoom)} & zoom > z_{max} \end{cases}$$

where $zoom = \frac{area_{face}}{area_{total}}$ and where nominal values for $z_{min}$ and $z_{max}$ are 0.8 and 1.2 respectively.

$$D_{Fill} = \frac{area_{unfilled}}{area_{total}} = \frac{area_{total} - area_{filled}}{area_{total}} = 1 - \frac{area_{filled}}{area_{total}}$$

$$D_{Scaling} = \begin{cases} 1 & scale < 1, \\ e^{(1-scale)} & scale \geq 1 \end{cases}$$

$$D_{Yaw} = \begin{cases} \dfrac{1}{1 + e^{-\left(\frac{12}{110}yaw + 6\right)}} & yaw < 0, \\ \dfrac{1}{1 + e^{\left(\frac{12}{110}yaw - 6\right)}} & yaw \geq 0 \end{cases}$$

$$D_{Matching\ Name} = \begin{cases} 1 & FREPI \text{ name matches}, \\ 0.5 & \text{no } FREPI \text{ name}, \\ 0 & FREPI \text{ name different} \end{cases}$$

$$D_{Face\ Sharpness} = \begin{cases} e^{5(sharpness - s_{min})} & sharpness < s_{min}, \\ 1.0 & sharpness > s_{min} \end{cases}$$

where the nominal value for $s_{min}$ is 0.6

$$D_{Face\ Brightness} = \begin{cases} e^{20(brightness - b_{min})} & brightness < b_{min}, \\ 1.0 & b_{min} \leq brightness \leq b_{max}, \\ e^{20(b_{max} - brightness)} & brightness > b_{max} \end{cases}$$

where nominal values for $b_{min}$ and $b_{max}$ are 0.3 and 0.7 respectively $$D_{Date\ Taken} = e^{-\frac{4}{20}|referencedate - datetaken|}$$

Other suitable desirability informants might include additional metadata associated with the image, such as place taken (either as a name or GPS coordinates), name of photographer, or some other metadata or information. Desirability functions for additional informants would be chosen such that the informant values that best match the intended display scenario have a desirability close to 1.0 and those that least match the intended display scenario have a desirability close to 0.

After processing all the available images for a celebrity, a weighted sum of all the visual desirability informants may be computed for each of the images associated with the celebrity. For the exemplary visual desirability informants described herein, the formula applied may be $D = w_{centre} \times D_{centre} +$ $w_{zoom} \times D_{zoom} +$ $w_{fill} \times D_{fill} +$ $w_{scale} \times D_{scale} +$ $w_{yaw} \times D_{yaw} +$ $w_{name} \times D_{name} +$ $w_{sharpness} \times D_{sharpness} +$ $w_{brightness} \times D_{brightness} +$ $w_{datetaken} \times D_{datetaken}$ where w represents the weight of a given informant. More generally, for n desirability informants, the formula applied may be $D = \sum_{i=1}^{n} w_i \times D_i$. Informant weights may be determined experimentally by the designer of the system.

The images for the celebrity may in this way be ranked by their desirability score, where the highest score is the most suitable image and the lowest score is the least suitable image.

The weights may be chosen experimentally by building a model that minimizes the error in the model choosing the best face that matches the one identified by human observers over a suitable training set of celebrities with multiple images each.

An alternative method of choosing the best method exists, whereby a filtering step is first done to limit the images for which desirability is computed to those that meet certain minimum quality criteria. An example set of minimum quality criteria is:

No synthesis of pixels needed

Face region identified is larger than desired target image size (i.e. no up-sampling needed)

The list of detected facial features meets some basic minimum requirement, for example the presence of a nose, the presence of at least one eye, and the presence of at least one ear.

Subject is positively identified (for example, there is only one extracted face in the image, or the Extracted Face Identification step yields a subject identifier that matches the nominal celebrity subject).

Assuming that the set of images remaining after the filtering step is non-empty, the previously described ranking algorithm is executed on the filtered set to choose the best one. Alternatively, if no images remain after filtering, then the desirability ranking is executed on the full set of images associated with the celebrity.

The main benefit of the pre-filtering step is risk elimination; we know that our algorithm works well when the image meets some basic criteria. When those basic criteria are not met then we sometimes get unpleasant visual artifacts.

Examples of the Application of One Version of the Invention

Here we present examples of the application of one version of the invention that has been reduced to practice. These examples include both comparisons between the output of this version of the invention and the output of competing commercially available systems. They also include examples of the results of applying this version of the invention to various images in a commercially available image catalog.

Comparison with commercially available systems. In FIG. 6 and FIG. 7 we exhibit comparisons between the results of the application of one version of the invention with the results of commercially available systems. In each instance we show results obtained, from what is apparently the same source image, for both the subject invention, and the images displayed within competing commercially available systems. (Two commercially available systems are respectively "Microsoft™ Movies and TV" and "Apple TV+™.")

Results for different extraction geometries. FIG. 8 shows results for one version of the invention over a test set of celebrity images. The table in the figure shows three columns:

The original image, annotated with the inner bounding box, the resulting circular region (with 20% top padding, no side or bottom padding), and the outer bounding box.

Extraction of a circular image. The image expanded as needed and missing pixels synthesized as described above.

Extraction of an elliptical image. An elliptical image extracted with 20% top padding, 7% left and right padding, and 5% bottom padding. The minor axis was set to 80% of the major axis (k=0.8). The image expanded as needed and missing pixels synthesized as described above.

Columns 2 and 3 show the boundary of circular region so that we can see the region that will ultimately be visible to the user after the circular mask is applied.

The results show that the invention can reliably extract head-shots from all images in our test set. Many of the images feature some synthesized samples, and they generally don't seem out of place, or detract from the headshot.

Variations and Refinements

In this section we identify selected variations and refinements of the invention. These are not to be understood as limiting, but rather to demonstrate additional ideas and versions, all of which comprise elements of the invention.

Determining a Cropping or Masking Region or Both (Alternate)

As discussed above, for some images, the selected head region is close the boundary of the image. When this occurs, the invention may need to synthesize pixels in order the center the head within the desired circular region. Sometimes, if the face or hair extend to the boundary of the image, this synthesis produces unwanted visually unpleasant artifacts. This is illustrated in FIG. 9. We now describe variations of the invention that eliminate or reduce these unwanted artifacts. These variations may be applied separately or in conjunction to achieve the desired effect.

Resizing and Re-centering the Image First, the invention may resize the selected circular region and/or shift the selected region. Reducing the size of the selected circular region has the effect of "zooming in" further on the face. Shifting has the impact of moving the face off-center in the image. Reducing the size and shifting are done to minimize the number of pixels that need to be synthesized. For images where no or minimal synthesis of pixels is required by the original algorithm, no resizing or shifting is performed and the original algorithm is used. For images where the original algorithm results in a significant proportion of pixels to be synthesized we prefer to present the face zoomed in slightly more than ideal, or slightly off-center rather than produce unpleasant and artificial visual artifacts.

To detect whether the refined algorithm will be beneficial to the image, the margins between the edge of the selected region and the edge of the original source image are calculated. The margin will be negative in the case where the selected region extends beyond the original image and hence requires synthesis of pixels. Margins are calculated for each of the top, bottom, left, and right edges. These margins are labeled in FIG. 10 as $M_{top}$, $M_{bottom}$, $M_{left}$, $M_{right}$ respectively. From these margins the expansion ratios $E_{top}$, $E_{left}$, $E_{bottom}$, $E_{right}$ can be calculated as follows:

$$E_{top} = \frac{-M_{top}}{\text{Radius}}$$

$$E_{left} = \frac{S_{left}}{\text{Radius}}$$

$$E_{bottom} = \frac{S_{bottom}}{\text{Radius}}$$

$$E_{right} = \frac{S_{right}}{\text{Radius}}$$

The expansion ratio is a measure of the extent to which the final image will contain synthesized pixels. Because images typically only require synthesized pixels when the detected target face is close to the image boundary, the expansion ratio is typically positive when the detected face is close the image boundary. The presence of synthesized pixels is often most noticeable when the subject's face is close to the image boundary.

Experiments conducted on a test catalog of images showed that images with an expansion ratio not exceeding 0.15 at any edge typically yield good results with the original algorithm. For images with an expansion ratio exceeding 0.15 at any edge, that is any of $E_{top}$, $E_{bottom}$, $E_{left}$, or $E_{right}$ are greater than 0.15, a refined algorithm is applied that resizes and re-centers the selected circular region. The refined algorithm starts with face detected by FREPI and the selected circular region generated from the original algorithm.

First, for images where the selected circular region extends beyond the original image boundary in both the horizontal and vertical dimensions, that is $(M_{top}+M_{bottom})<0$ and $(M_{left}+M_{right})<0$, the radius of the selected circular region is reduced such that synthesis is then only required in one direction, that is either $(M_{top}+M_{bottom})<0$ or $(M_{left}+M_{right})<0$, but not both. Images that exhibit negative margins in both directions are already very close-up facial images so using the circular region selected by the original algorithm the final image would contain a large proportion of synthesized pixels.

Next, a similar reduction in radius is applied to images where synthesis is required in either the horizontal or vertical direction, that is $(M_{top}+M_{bottom})<0$ or $(M_{left}\ M_{right})<0$. In this case though, reducing the radius by too much will likely cause part of the face to be cropped, so a limit is imposed on amount that the radius can be reduced by. A limit on the radius reduction proportional to the FREPI detected face height yields good results. Reducing the radius of the circular region reduces the number of pixels to be generated, at the risk of cropping part of the subject's face. For very closeup images such as those that fall into this category, other commercial systems that do not make use of synthesized pixels to extend the image will inevitably crop part of the subject's face when applying a circular mask. By allowing some synthesis of pixels the refinement algorithm is able to find achieve a balance between the presence of artifacts from synthesis and cropping the subject's face.

It should be noted that the reduction in size of the selected circular region is done prior to any down-sampling of the image. As such, the circular region is still larger than the ultimate image size typically presented to the user. The reduction in the size of the circular region therefore has no effect on the size of the final image, but rather has the effect of zooming in closer on the subject's face.

Finally, having reduced the size the selected image region, the refined algorithm shifts the selected circular region to minimize the extent to which pixels are synthesized while not cropping the subject's face. A shift may be applied in both the horizontal and vertical dimensions. Following the size reduction described in the previous steps, for each of the horizontal and vertical dimensions, the circular region should only extend beyond the boundary of the original image at one edge. For instance, the region may extend beyond the original image at either the left or the right edge, but not both. For each edge $\epsilon$, where E stands for one of top, bottom, left or right, at which the selected region extends beyond the original image, that is $M_\epsilon<0$, a shift is calculated. The amount of the shift applied is the minimum of the amount needed to eliminate the need for synthesis, which is $-M_\epsilon$, and the margin between the opposite edge of the face as detected by FREPI and the opposite edge of the selected circular region. This approach shifts the circular region as much as possible to eliminate the need to synthesize pixels, while not cropping the subject's face at the opposite edge. In many cases, some pixel synthesis will still be needed. However, since the number of synthesized pixels is greatly reduced, it is less noticeable and the presence of unpleasant artifacts less frequent. FIG. 28 shows the effect of the alternate cropping or masking and image expansion methods described above.

Secondly, the invention may apply a sequence of blurring filters to the edges of the image with pixels toward the outer edges of the cropped image, which may include synthesized pixels, blurred to a greater extent than pixels further in. This has the effect of the edges of the image appearing slightly out of focus. By using a sequence of filters we do not observe any unpleasant artifacts at the boundary where filtering starts.

Four two dimensional low-pass filters are defined at different increasing levels of coarseness: $K_0, K_1, K_2, K_3$. The coarsest filter is applied only to the region towards the outer edge of the image.

As depicted in FIG. 11, first the coarsest filter is applied to regions with a space of more than $T_3$ pixels from the face. The next coarsest filter is then applied to a slightly larger area but again leaving some margin around the face; that is to regions with a space of more than $T_2$ pixels from the face, with $T_2\ T_3$. This is repeated for the remaining 2 filters, getting progressively closer to the face.

In the case where the invention receives images for a celebrity from multiple providers we may use the image quality and facial pose parameters to determine be best image to display. For instance the invention may prefer an in-focus image where the subject is looking straight at the camera. The invention may also use other informants such as:

a. The date the image was taken. The invention may select either the most recent image or an image taken most closely to the release date of the title we are displaying.
b. The invention may apply a mechanism to evaluate the likelihood that the invention is clipping any part of the face or hair; the invention may select the image that has the highest probability that the face has not been clipped.
c. The invention may select images with a simpler background since small images with complicated backgrounds often appear unclear
d. Where the celebrity is in fact a group rather than a single person the invention may apply an alternate algorithm to work out the best circular region enclosing the entire group rather than simply creating a bounding box around all of the faces.

A detailed explanation of these methods may be found herein in the "Image Selection" section.

The padding around the bounding rectangle returned by the FREPI module may be calibrated to take into account which part of the face the FREPI module detects. One instance of the FREPI module seems to detect hairline down to bottom of chin, so a greater percentage of padding is required at the top. Padding proportions are determined experimentally. This could be done by using a training set where a person manually selects the ideal circle to bound the face, and then comparing against the bounding box rectangle to determine the best average padding to use in each direction.

The general padding algorithm may be modified to handle the case when the desired celebrity is not face-on to the camera. In this case, the invention can estimate which way the celebrity is facing (by assessing how far their head is turned) then the padding can be adjusted appropriately to give a better center and radius for the crop circle to avoid cutting off any significant part of the celebrities face.

Determining the direction in which the celebrity is facing may be estimated using the bounding box of the face, and the relative location of key features such as eyes, ears, nose and mouth to this bounding box. Geometry can then be used to get an estimate of which direction the face is turned towards, and how far.

The invention may modify the padding parameters over time by use of the information the invention maintains from (a) any manual corrections made in response to observing sub-optimal output for any images and (b) any hand-selected crop regions made to address the "failed images". Both of these inputs would be used to refine the padding model, and thus improve the default cropping chosen by the algorithm for future faces added to the database.

The invention may process multiple catalogs. It could be that a given celebrity has multiple images across these sources: some photos of the celebrity by himself or herself and some in a photo with others. The invention may make use of a face-comparison algorithm to compare one of the individual faces with each of the faces identified in a group photo, and the one that most closely matches the individual one is highly likely to be the celebrity of interest.

In the case where there are multiple images for a single celebrity, the invention could arrange them into a timeline by age as reported by the FREPI module.

Variations of the invention also exist for handling certain special cases and situations, notably:
 a. Determining a circular mask when the subject is not facing the camera
 b. Improving the determination of which face in an image is the nominal entry subject
 c. Flagging and handling cases when the entry subject is a group rather than a single individual We now discuss these specific variations.

Determining a circular mask when the subject is not facing the camera. The invention may use estimates of the Pitch, Roll, and Yaw of the face to add padding to one or more sides of the estimated facial region. For example, a person facing their left (Yaw) will have their facial features concentrated on the right side of the image. This will likely result in the back of their head being clipped on the left side of the image. To counter this we might add padding to the left side of the image and possibly trim the right side of the circular region. The FREPI Module may provide estimates of Pitch, Roll, and Yaw.

Alternately the invention may use the eye positions, nose position, and mouth end positions to generate our own estimate of Pitch, Roll, and Yaw, or even directly estimate an ideal circular region around the face. The FREPI Module may provide estimated coordinates of these facial features.

The invention may utilize hand-reviewed circular regions for some quantity of images to train a model to identify an optimal bounding box based on at least one or more of: eye positions, nose position, mouth position, gender, the image background, and possibly other image quality related features. This is based on the premise that the aesthetically optimal region is likely more complicated than simply the bounding box of the faces padded arbitrarily.

Improving the determination of which face in an image is the nominal entry subject. Currently when multiple faces are found the invention may rely solely on the FREPI Module to identify the face corresponding to the entry subject. There are many cases though where the entry subject is not identified, yet there are clues in the image as to which face is the entry subject, which the invention may make use of:
 i. Differences in face size—If one face is much larger than the others then that face is likely the target celebrity.
 ii. Image Sharpness/Brightness—If one face is in focus (high sharpness) and the other faces are less focused (low sharpness), then it is likely that the target celebrity is in focus. Likewise the photographer is likely to have the lighting correct for the subject of the image.
 iii. Gender—If the image features a male and female and we know the gender of the target celebrity then we can quickly distinguish the correct face. Anecdotally this may be quite a frequent occurrence as many of our pictures are red carpet shots of the celebrity arriving at an event with their partner.
 iv. Age—If the image features only one person in the age range of the target celebrity then we can easily determine the correct face.

Versions of the FREPI module may return age, gender, face sharpness and face brightness, for each face found in the image.

Flagging and handling cases where the entry subject is a group rather than a single individual. In many cases entry subject may be a group of people, not a single person. In some instances a suitable notation is associated with the entry; if so the invention may make use of this information. In other instances the invention may make use of the subject identifier. For instance, a textual subject identifier that matches the regular expression pattern "The,*s" is unlikely to be an actual person (example "The Misfits"). Likewise the presence in the subject identifier of the word "and", the character "+", or the character "&" is probably a good indicator that the subject is a group. Beyond simple patterns the invention may make use of a statistical model to identify if a string is likely a person's name; this might not be clear for many names, but for some it should be straightforward (for example "Cute is What We Aim For").

In cases where the invention determines that the target may be a group of people the invention may extract a circular region that captures all faces from the image.

In this section we describe possible architectures of complete systems. These architectures also constitute part of the invention. This discussion is not intended to be limiting; other system architectures are possible.

Direct Retrieval Architecture

FIG. 12 depicts a Direct Retrieval system architecture.

In this system architecture, one or more image catalogs comprise the system input. Entries from each catalog may be processed by at least one of the steps described above or any suitable variant thereof or addition thereto. The Processed Entry Data Base may contain direct outputs.

Also in this system architecture, a User Device may query the Processed Entry Data Base for a desired image. The query response may include at least an actual image, which is displayed on the User Device. The query response may also include additional processing details or instructions (for instance, cropping instructions, or the type or coordinates of a circular, elliptical or otherwise shaped mask) which may additionally be utilized by the User Device to process, prepare or otherwise display the final image.

One advantage of this architecture is that only a single image query and query response is required for the User Device to obtain the image in question, possibly providing lower service latency.

Referenced Retrieval System Architecture

FIG. 13 depicts a Referenced Retrieval system architecture.

In this system, one or more image catalogs comprise the system input. Entries from each catalog may be processed by at least one of the steps described above (Face Extraction; Target Face Selection; Image Cropping, Optional Expansion) or any suitable variant thereof or addition thereto. The Processed Entry Data Base may contain reference outputs.

In this system architecture, a User Device may query the Processed Entry Data Base for a desired image. The query response may include at least instructions regarding retrieval of an image catalog or other image source that may contain an actual image, along with instructions (for example, how the image may be cropped at the source before transmitting it to the requesting User Device) that may be utilized by the image catalog or source. The query response may also include additional processing details or instructions (for instance, cropping instructions, or the type or coordinates of a circular, elliptical or otherwise shaped mask) which may additionally be utilized by the User Device to process, prepare or otherwise display the final image.

One advantage of this architecture is that the operator of the Processed Entry Data Base does not have to store the actual image data itself, nor transmit it to the User Device, possibly lowering the operator's costs.

Other System Architectures

Other system architectures are possible. Notably a hybrid architecture is possible, in which the Processed Entry Data Base contains different kinds of processed catalog entries (that is both direct outputs and reference outputs, or other kinds of outputs).

Additional architectures that make use of information retained in a Processed Data Base to adjust the invention operating parameters are also possible. Diagrams exhibiting such architectures appear in FIG. 14 and FIG. 15 below.

What is claimed is:

1. A method comprising:
    obtaining, by a computing system, a first image to be processed;
    extracting, by said computing system, a face from said first image by determining a region of said first image that comprises said face;
    labeling, by said computing system, said face with an identifier that is associated with a subject to whom said face belongs;
    verifying, by said computing system, that an identity established by said identifier matches a nominal identity that is associated with said first image;
    determining, by said computing system, a cropping region and/or a masking region for said face;
    determining, by said computing system, that said cropping region and/or said masking region includes pixels for which no value exists in said first image;
    resizing and/or shifting said cropping region and/or said masking region to lessen a number of the pixels;
    expanding, by said computing system, said first image by synthesizing the pixels that fall within bounds of said cropping region and/or said masking region for which no values exist in said first image; and
    applying, by said computing system, said cropping region and/or said masking region to said first image, so as to produce a second image that is representative of a subset of said first image with at least some synthesized pixels.

2. The method of claim 1, wherein said first image is included in an entry of an image catalog that is accessible to said computing system via a network.

3. The method of claim 1, wherein said region is represented by a bounding box whose coordinates define pixels of interest in said first image.

4. The method of claim 1, wherein said region is a subset of said first image.

5. The method of claim 1, further comprising:
    identifying, by said computing system, at least one facial feature of said subject based on an analysis of said region of said first image.

6. The method of claim 1, further comprising:
    identifying, by said computing system, an orientation of said face in three-dimensional space based on an analysis of said region of said first image.

7. The method of claim 1, further comprising:
    identifying, by said computing system, a measure of quality based on an analysis of said region of said first image.

8. The method of claim 7, wherein said measure of quality is representative of a value for sharpness, brightness, or orientation as measured by pitch, roll, and yaw.

9. The method of claim 1, wherein said identifier is representative of a proper name.

10. The method of claim 1,
    wherein said face is one of a plurality of faces that are extracted from said first image, each face of said plurality of faces corresponding to a different one of a plurality of subjects, and
    wherein said identifier is a proper name of a group that includes said plurality of subjects.

11. A non-transitory medium with instructions stored thereon that, when executed by a processor of a computing system, cause said computing system to perform operations comprising:
    acquiring a first image of a given person;
    extracting a headshot of the given person by—
        identifying a first set of coordinates for a first bounding box that bounds a face in the first image,
        adding padding to the first bounding box, so as to create a second bounding box that is defined by a second set of coordinates,
        establishing one or more parameters of a masking region that encloses the second bounding box,
        determining that the masking region includes pixels for which no value exists in the first image,
        resizing and/or shifting the masking region to lessen a number of the pixels,
        synthesizing the pixels that fall within bounds of the masking region for which no values exist in the first image, and
        applying, to the first image, a mask defined by the masking region to obtain a second image that is representative of the headshot; and
    performing an action involving the second image.

12. The non-transitory medium of claim 11, wherein each coordinate in the first set of coordinates is a floating point number in a range of 0 to 1 that, when multiplied by either a height or a width of the first image, is representative of a pixel position.

13. The non-transitory medium of claim 11, wherein the masking region is representative of a circular region, and wherein the one or more parameters include a center of the circular region, a radius of the circular region, or both.

14. The non-transitory medium of claim 11, wherein the first bounding box is defined by four sides, and wherein a different amount of padding is added to at least one of the four sides.

15. A non-transitory medium with instructions stored thereon that, when executed by a processor of a computing system, cause said computing system to perform operations comprising:
    acquiring a first image of a given person;
    extracting a headshot of the given person by—
        identifying a first set of coordinates for a first bounding box that bounds a face in the first image,
        adding padding to the first bounding box, so as to create a second bounding box that is defined by a second set of coordinates,
        establishing one or more parameters of a masking region that encloses the second bounding box, synthesizing pixels that fall within bounds of the masking region for which no values exist in the first image, applying, to the first image, a mask defined by the masking region to obtain a second image that is representative of the headshot, and applying, to the second image, a sequence of blurring filters so that pixels located nearer an outer edge of the second image are blurred to a greater extent than pixels located nearer a center of the second image; and performing an action involving the second image.

16. The non-transitory medium of claim 11, wherein said performing comprises:

causing display of the second image on an interface.

17. The non-transitory medium of claim 11, wherein said performing comprises:

storing the second image in a repository such that the second image is able to serve as a reference output for the given person.

\* \* \* \* \*